(12) United States Patent
Milliren

(10) Patent No.: US 8,975,306 B2
(45) Date of Patent: *Mar. 10, 2015

(54) VISCOELASTIC FOAM LAYER AND COMPOSITION

(75) Inventor: Charles M. Milliren, Chesterland, OH (US)

(73) Assignee: Intellectual Property Holdings, LLC, Cleveland, OH (US)

( * ) Notice: Subject to any disclaimer, the term of this patent is extended or adjusted under 35 U.S.C. 154(b) by 562 days.

This patent is subject to a terminal disclaimer.

(21) Appl. No.: 10/576,033

(22) PCT Filed: Oct. 19, 2004

(86) PCT No.: PCT/US2004/034596
§ 371 (c)(1),
(2), (4) Date: Apr. 14, 2006

(87) PCT Pub. No.: WO2005/042611
PCT Pub. Date: May 12, 2005

(65) Prior Publication Data
US 2007/0021519 A1 Jan. 25, 2007

Related U.S. Application Data

(63) Continuation of application No. 10/691,052, filed on Oct. 22, 2003, now Pat. No. 7,078,443.

(51) Int. Cl.
*C08G 18/28* (2006.01)

(52) U.S. Cl.
USPC ........... 521/164; 521/125; 521/126; 521/127; 521/128; 521/129; 521/130; 521/131; 521/159; 521/163; 521/167; 521/170; 521/174

(58) Field of Classification Search
USPC ......... 521/125, 126, 127, 128, 129, 130, 131, 521/159, 163, 164, 167, 170, 174
See application file for complete search history.

(56) References Cited

U.S. PATENT DOCUMENTS

| | | | |
|---|---|---|---|
| 3,811,437 A | 5/1974 | Gardner, Jr. |
| 4,029,534 A | 6/1977 | Bocks et al. |
| 4,116,893 A | 9/1978 | Flanagan |
| 4,158,087 A | 6/1979 | Wood |
| 4,190,712 A | 2/1980 | Flanagan |
| 4,209,593 A | 6/1980 | Khanna |
| 4,212,954 A | 7/1980 | Nomura et al. |
| 4,282,330 A | 8/1981 | Austin |
| 4,346,205 A | 8/1982 | Hiles |
| 4,722,946 A | 2/1988 | Hostettler |
| 4,808,469 A | 2/1989 | Hiles |
| 4,866,102 A | 9/1989 | Pray et al. |
| 4,876,292 A | 10/1989 | Milliren |
| 4,980,386 A | 12/1990 | Tiao et al. |
| 4,987,156 A | 1/1991 | Tozune et al. |
| 5,028,637 A | 7/1991 | Milliren |
| 5,063,253 A | 11/1991 | Gansen et al. |
| 5,094,318 A | 3/1992 | Maeda et al. |
| 5,143,941 A | 9/1992 | Rossio et al. |
| 5,167,884 A | 12/1992 | Rossio et al. |
| 5,203,352 A | 4/1993 | Gardner, Jr. |
| 5,216,041 A | 6/1993 | Rossio et al. |
| 5,248,703 A | 9/1993 | Krueger et al. |
| 5,248,704 A | 9/1993 | Rossio et al. |
| 5,252,624 A | 10/1993 | Milliren et al. |
| 5,258,416 A | 11/1993 | Krueger et al. |
| 5,284,882 A | 2/1994 | Rossio et al. |
| 5,389,316 A | 2/1995 | Kerman |
| 5,405,886 A | 4/1995 | Milliren et al. |
| 5,415,802 A | 5/1995 | Milliren et al. |
| 5,417,880 A | 5/1995 | Milliren et al. |
| 5,420,170 A * | 5/1995 | Lutter et al. ................... 521/159 |
| 5,449,700 A | 9/1995 | Milliren et al. |
| 5,453,455 A | 9/1995 | Krueger et al. |
| 5,457,137 A | 10/1995 | Milliren et al. |
| 5,476,969 A | 12/1995 | Hinz et al. |
| 5,527,833 A | 6/1996 | Kuczynski et al. |
| 5,580,651 A | 12/1996 | Kerman |
| 5,594,097 A | 1/1997 | Chaffanjon et al. |
| 5,669,094 A | 9/1997 | Swanson |
| 5,672,636 A | 9/1997 | Horn et al. |
| 5,698,609 A | 12/1997 | Lockwood et al. |
| 5,847,014 A | 12/1998 | Nodelman et al. |
| 5,874,485 A | 2/1999 | Milliren et al. |
| 5,919,935 A | 7/1999 | Platz et al. |
| 6,028,122 A | 2/2000 | Everitt et al. |
| 6,034,148 A | 3/2000 | Kelly et al. |
| 6,051,624 A | 4/2000 | Bastin et al. |
| 6,100,363 A | 8/2000 | Sampara et al. |
| 6,108,825 A | 8/2000 | Bell et al. |
| 6,127,443 A | 10/2000 | Perry et al. |
| 6,136,879 A | 10/2000 | Nishida et al. |
| 6,235,138 B1 | 5/2001 | Parks et al. |
| 6,258,867 B1 | 7/2001 | Nodelman et al. |
| 6,316,514 B1 * | 11/2001 | Falke et al. ................... 521/174 |
| 6,326,077 B1 | 12/2001 | Monaci |
| 6,337,356 B1 | 1/2002 | Zaschke et al. |
| 6,346,204 B1 | 2/2002 | Eling |
| 6,379,595 B1 | 4/2002 | Byma et al. |
| 6,391,933 B1 | 5/2002 | Mattesky |
| 6,391,935 B1 | 5/2002 | Hager et al. |

(Continued)

FOREIGN PATENT DOCUMENTS

CA 2216777 A1 10/1997
EP 0837093 A 4/1998

OTHER PUBLICATIONS

Supplementary European Search Report issued Oct. 27, 2009 in corresponding European application No. EP 04795722.

*Primary Examiner* — John Cooney
(74) *Attorney, Agent, or Firm* — Pearne & Gordon LLP

(57) ABSTRACT

A viscoelastic foam system is provided having an amine-based polyoxypropylene extended polyol to impart strength, recoverability and endurance to the foam, and an appropriately selected non-amine-based polyol to provide flexibility to the foam. The combination of amine-based propylene oxide extended polyol and non-amine-based polyol provides a viscoelastic semi-rigid foam with excellent impact and recovery properties, recovering to substantially 100% of its initial volume and shape following an impact, yet with sufficient rigidity and stiffness so that it is effective at absorbing multiple impacts. A method of making the above viscoelastic foam is also provided.

2 Claims, 16 Drawing Sheets

(56) References Cited

U.S. PATENT DOCUMENTS

| | | |
|---|---|---|
| 6,420,447 B1 | 7/2002 | Kittel et al. |
| 6,420,448 B1 | 7/2002 | Hnatow et al. |
| 6,425,141 B1 | 7/2002 | Ewing et al. |
| 6,451,233 B1 | 9/2002 | Byma et al. |
| 6,451,430 B1 | 9/2002 | Smith |
| 6,472,473 B1 | 10/2002 | Ansems et al. |
| 6,491,846 B1 | 12/2002 | Reese, II et al. |
| 6,506,813 B1 | 1/2003 | Parfondry et al. |
| 6,521,674 B1 | 2/2003 | Haley et al. |
| 6,586,485 B1 | 7/2003 | Bruchmann et al. |
| 6,586,486 B2 | 7/2003 | Falke et al. |
| 6,586,487 B1 | 7/2003 | Nodelman et al. |
| 6,610,618 B1 | 8/2003 | Bottger et al. |
| 6,612,217 B1 | 9/2003 | Shockey et al. |
| 6,617,369 B2 | 9/2003 | Parfondry et al. |
| 6,635,203 B2 | 10/2003 | Monaci |
| 6,653,363 B1 | 11/2003 | Tursi, Jr. et al. |
| 6,699,917 B2 * | 3/2004 | Takashima .................... 521/174 |
| 6,762,274 B2 | 7/2004 | Waddington et al. |
| 7,078,443 B2 * | 7/2006 | Milliren ........................ 521/167 |
| 2003/0134921 A1 * | 7/2003 | Dexheimer ................... 521/108 |
| 2004/0097608 A1 | 5/2004 | Re'em |
| 2004/0127590 A1 | 7/2004 | Whinnery et al. |
| 2004/0242718 A1 | 12/2004 | Tu et al. |
| 2004/0254256 A1 | 12/2004 | Lockwood et al. |
| 2004/0266897 A1 * | 12/2004 | Apichatachutapan et al. .............................. 521/131 |
| 2004/0266900 A1 | 12/2004 | Neff et al. |
| 2005/0038133 A1 | 2/2005 | Neff et al. |

* cited by examiner

VISCOELASTIC FOAM LAYER AND COMPOSITION

CROSS-REFERENCE TO RELATED APPLICATIONS

This application is a 371 national stage entry of PCT patent application No. PCT/US2004/034596 filed Oct. 19, 2004, which is a continuation of U.S. patent application Ser. No. 10/691,052 filed Oct. 22, 2003, now U.S. Pat. No. 7,078,443.

BACKGROUND OF THE INVENTION

Polymeric protective foams (e.g. protective foam layers) are widely used for impact force attenuation in a variety of safety-related applications. These include but are not limited to automotive applications, sport applications, bedding applications, footwear applications, etc. In general, a protective foam layer is placed adjacent or against a part of a person's body in order to protect that body part (e.g. a head) during an impact with, for example, the ground or even another person's head.

Protective foams function by absorbing and/or dissipating the impact energy from the force of an impact. An energy absorbing foam deforms or crushes upon impact thereby consuming a portion of the impact energy so that portion does not reach the underlying body part. An energy dissipating foam also spreads the impact force over a larger surface area than the actual area of impact so that the force per unit area is decreased for the underlying body part compared to that for the initial impact surface (e.g. the outer surface of the protective layer or a hard outer shell over the protective layer).

All rigid or semi-rigid protective foams are energy dissipating foams to some extent because, due to their rigidity, they do not instantaneously and completely yield on impact. This would result in the transmission of the entire impact force to the localized region of the underlying body part immediately beneath the protective layer at the point of impact. Instead, rigid and semi-rigid foam layers typically have sufficient rigidity to transmit at least a portion of the impact energy from the point source (impact site) to lateral or adjacent regions of the foam layer on impact. The result is to spread the impact force over a larger area and thereby reduce the force per unit area experienced by the underlying body part as described above.

However, traditional rigid and semi-rigid foams exhibit satisfactory energy absorption only above certain impact speeds, e.g. above about 4-7 meters/second (m/s) for expanded polystyrene (UPS) which is the most common rigid foam found in bicycle and motorcycle helmets. This is because the foam is so stiff that it must experience a minimum threshold impact velocity in order for there to be sufficient energy to crush the foam. Practically, this means that up to this threshold velocity, virtually all impact energy will be transmitted to the underlying body part and not absorbed by a rigid foam like EPS. An additional problem with EPS foams is that they are non-recovering; i.e. they do not recover or rebound to any significant degree once they have been crushed from an impact. They are effective for only single-impact use and then must be discarded.

Existing semi-rigid polyurethane foams address these shortcomings to some extent as a result of their limited viscoelastic properties. Though existing semi-rigid foams can be compressed or deflected at lower impact velocities to absorb some degree of the impact energy, they cannot effectively absorb the energy from higher velocity impacts compared to rigid foams like EPS. Some designers have attempted to formulate urethane foams that are more rigid and can provide protection similar to EPS. However, these more rigid urethane foams also correspondingly begin to suffer from the same drawbacks, which initially led the designers away from rigid foams like EPS. The more rigid the foam, the less it will recover after being crushed, and the poorer low to moderate impact energy absorption it will provide.

Consequently, there is a need in the art for a semi-rigid viscoelastic polymeric foam that is rigid enough to provide adequate impact energy absorption at high impact speeds, e.g. 4-7 m/s or greater, and yet recovers substantially 100% after impact. Most preferably, such an improved foam will also provide adequate low to moderate speed impact protection to the underlying body part of a user of the foam.

SUMMARY OF THE INVENTION

A viscoelastic foam is provided that is made from a Part A composition and a Part B composition. The Part A composition has 20-50 weight percent isocyanate (NCO), and the Part B composition has at least 10 parts by weight of one or a mixture of propylene oxide-extended amine-based polyether polyols having substantially no ethylene oxide extension units, at least 10 parts by weight of an additional polyol selected from the group consisting of filled polyether polyols and unfilled polyether polyols, and 0.01-4 parts by weight catalyst. The Part A and Part B compositions are combined to provide the viscoelastic foam having an index of 60-130.

A viscoelastic foam also is provided that is made from a Part A composition and a Part B composition, where the Part A composition has 20-50 weight percent isocyanate (NCO), and the Part B composition has at least 10 parts by weight of one or a mixture of propylene oxide-extended amine-based polyether polyols having substantially no ethylene oxide extension units, at least 10 parts by weight of an additional, tri-functional polyether polyol, and 0.01-4 parts by weight catalyst. The Part A and Part B compositions are combined to provide the viscoelastic foam having an index of 60-130.

A method of making a viscoelastic foam also is provided, which includes the following steps: a) providing a Part A composition having 20-50 weight percent isocyanate; b) providing a Part B composition having at least 10 parts by weight of one or a mixture of propylene oxide-extended amine-based polyether polyols having substantially no ethylene oxide extension units, at least 10 parts by weight of an additional polyol selected from the group consisting of filled polyether polyols and unfilled polyether polyols, and 0.01-4 parts by weight catalyst; and c) combining the Part A and Part B compositions to provide the viscoelastic foam having an index of 60-130.

A further method of making a viscoelastic foam is provided, which includes the following steps: a) providing a Part A composition having 20-50 weight percent isocyanate; b) providing a Part B composition having at least 10 parts by weight of one or a mixture of amine-based polyether polyols having substantially no ethylene oxide extension units, at least 10 parts by weight of an additional, tri-functional polyether polyol, and 0.01-4 parts by weight catalyst; and c) combining the Part A and Part B compositions to provide the viscoelastic foam having an index of 60-130.

DETAILED DESCRIPTION OF THE PREFERRED EMBODIMENTS OF THE INVENTION

Figure 1:
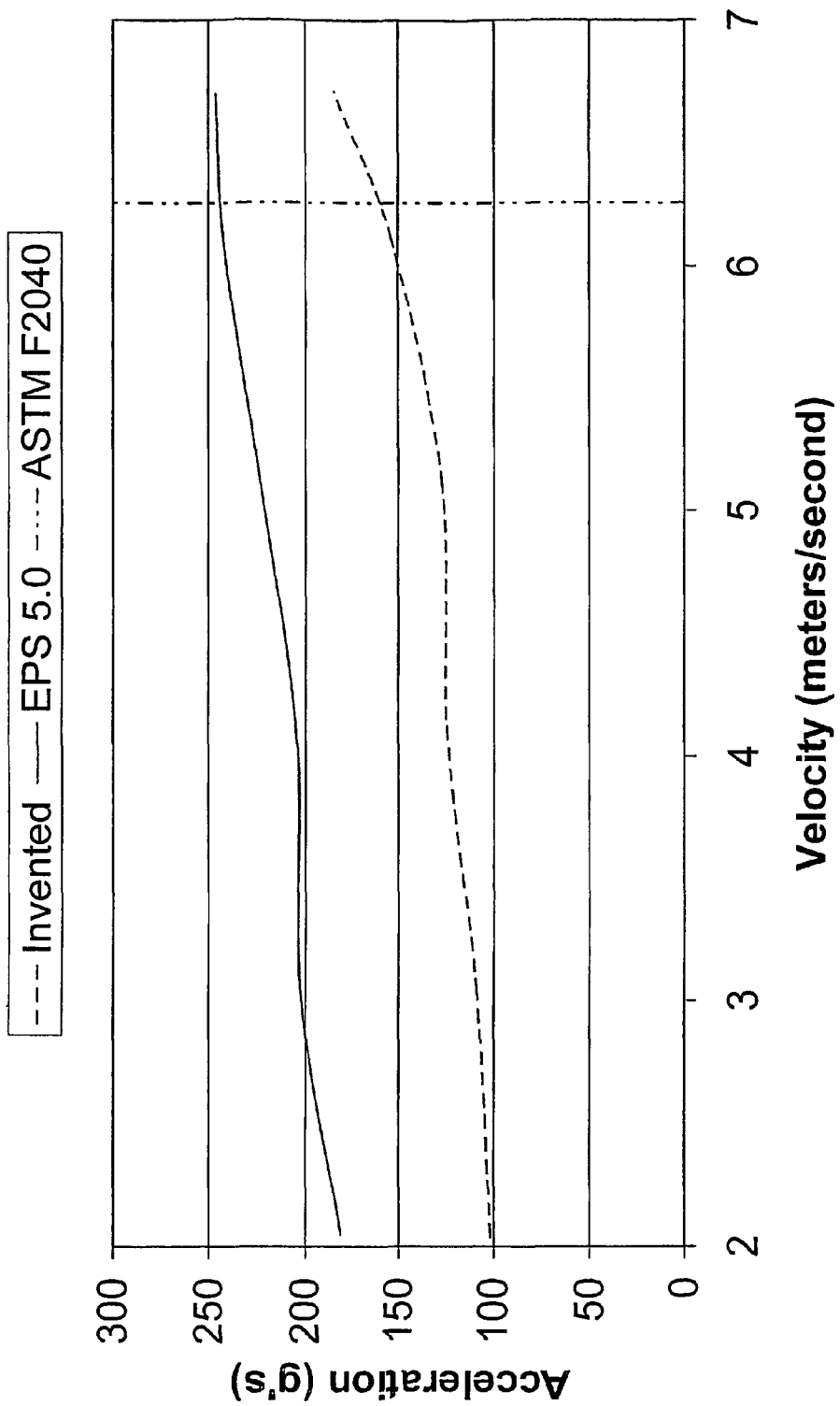
FIG. 1 is a graph of acceleration versus velocity comparing the performance of the invented viscoelastic foam of Example 1 with expanded polystyrene using a flat impactor.

A technology based upon a novel polyol mixture has now been developed which allows for the production of molded or free rise energy absorbing foams that possess the desired characteristics of absorbing both high (above 4-7 m/s) and low speed dynamic impacts without permanent deformation. As used herein, when a range such as 5-25 (or 5 to 25) is given, this means preferably at least 5 and, separately and independently, preferably not more than 25. Unless otherwise explicitly indicated, all parts herein are parts by weight. Also as used herein, the terms oxypropylene and propylene oxide are used synonymously and interchangeably as known in the art, as are the terms oxyethylene and ethylene oxide.

A composition and method of making the invented viscoelastic polymeric foam is provided. The invented foam is preferably prepared by reacting a Part B composition with a Part A composition. The Part A and B compositions are preferably prepared separately. Table 1 below discloses the compositions of Parts A and B that are subsequently blended to provide examples of the invented viscoelastic polymeric foam. In Table 1, for Part A all values are weight percents with respect to the total composition of Part A. For Part B, all values are parts by weight with respect to the total composition of Part B. For each of Parts A and B, any less preferred or more preferred concentration or range for any one component can be combined with any less preferred or more preferred concentration or range for any of the other components; it is not necessary or required that all of the concentrations or ranges for all of the components for either Part A or Part B come from the same column.

TABLE 1

Part A and B Compositions for Invented Viscoelastic Foam

| Component | Preferred | Less Preferred | Less Preferred |
|---|---|---|---|
| Part A | | Weight Percent | |
| Isocyanate (% NCO) | about 23 | 22–26<br>18–29<br>18–40 | 16–45<br>14 to about 50 |

TABLE 1-continued

Part A and B Compositions for Invented Viscoelastic Foam

| Component | Preferred | Less Preferred | Less Preferred |
|---|---|---|---|
| Part B | | Parts By Weight | |
| Amine-based polyether polyol | 49–51<br>45–55 | 40–60<br>35–65 | 30–70<br>25–75<br>20–80<br>10–80 |
| Filled polyether polyol | 24–25<br>22–28 | 20–30<br>18–32<br>15–35 | 12–36<br>10–40<br>0–50 |
| Unfilled polyether polyol | 24.5–25.5<br>22–28 | 20–30<br>18–32<br>15–35 | 12–36<br>10–40<br>0–50 |
| Catalyst | 0.4–2.5<br>0.5–2.05 | 1.7–2.1<br>1.6–22<br>1.5–2.3 | 1.4–2.4<br>1.3–2.5<br>1–3<br>0.01–4 |
| Blowing agent | 3 | 2.8–3.2<br>2.5–4 | 2.2–4.2<br>2–4.5<br>0.5–5 |
| Black paste | 6 | 5.8–6.2<br>5.5–6.5 | 5–7<br>4–8<br>1–10<br>0–15 |

Each of the components from Table 1 above will now be discussed. The Part B components are discussed first.

The amine-based polyether polyol component is provided to impart strength and durability to the finished viscoelastic foam. Amine-based polyols are more reactive than non-amine-based polyols that are typically used in viscoelastic foams. A wide variety of amine-based polyols are known in the art, such as monoethanolamine-based polyether polyols, diethanolamine-based polyether polyols, ethylenediamine-based polyether polyols and triethanolamine-based polyether polyols. The amine-based polyether polyol in Table 1 is propylene oxide-extended and has no or substantially no ethylene oxide extension units (explained below), and is at least 2, preferably at least 3 or 4, functional; i.e. the amine-based polyether polyol preferably has at least 2, preferably at least 3 or 4, functional reactive sites per molecule.

In one embodiment, the invented viscoelastic foam could comprise a single amine-based polyether polyol that is at least 3-functional and has an OH number less than or about 150. In this embodiment, the amine-based polyol is preferably a diamine-based polyol, preferably ethylenediamine which is 4 functional or a monoamine-based polyol, preferably triethanolamine which is 3 functional.

Most preferably, the amine-based polyether polyol component is a mixture of amine-based polyether polyols where the sum of the weights of all such polyols corresponds to the parts by weight listed in Table 1 for the amine-based polyol component. In a preferred embodiment, the amine-based polyol component in Table 1 is comprised of the following three polyols in the following preferred parts by weight:

1. Monoethanolamine-based polyol: 0-15, preferably 2-14.5, preferably 3-14, preferably 4-13.5, preferably 5-12, preferably 7-11.5, preferably 8-11, preferably 8-10, preferably about 8.5-9.5;

2. Triethanolamine-based polyol: 5-80, preferably 8-70, preferably 10-70;

3. Ethylenediamine-based polyol: 0-50, preferably 0-48, preferably 0-46, preferably 0-40, preferably 0-38, preferably 0-36, preferably 0-34, preferably 0-31.

Each of the above amine-based polyol(s) is propylene oxide extended in order to regulate or slow the foam reaction rate, and excludes or substantially excludes ethylene oxide units. That is, the chains (or "legs" as known in the art) extending from the amine-based initiator molecule(s) of the amine-based polyols according to the invention do not include any or substantially any (or are free or substantially free of) ethylene oxide units. By this it is meant that ethylene oxide is not used purposefully, either alone or in combination with propylene oxide, to extend the side chains of any amine-based polyols, and that any ethylene oxide units that are or may be present in any amine-based polyol according to the invention are present solely as in impurity or otherwise due to inevitable trace quantities of ethylene oxide which are or may be found in commercially available sources of propylene oxide or other reagents used to prepare the amine-based polyether polyols.

Alternatively to the parts by weight concentrations of the amine-based polyol component listed in table 1, and particularly when the foam is to be a free rise foam, the total parts by weight of amine-based polyol in the part B composition can be selected from the range of 50-80, or, more advantageously of 60-70. (See foam compositions of Example 3 below).

The filled polyether polyol component preferably is a polyoxypropylene-polyoxyethylene-extended polyol, is at least tri-functional and is glycerin-based. In a preferred embodiment, the chains extending outward from the initiator molecule (e.g. glycerin) are essentially block copolymers having at least one polyoxypropylene block and at least one polyoxyethylene block, wherein the at least one polyoxyethylene block is provided at the terminal end of each chain, conventionally referred to as polyoxyethylene (or ethylene oxide) "tipped." Alternatively and less preferably, the chains can be homopolymers of either polyoxypropylene or polyoxyethylene. Polyoxypropylene homopolymer chains are less preferred because oxypropylene units generally are not sufficiently reactive to facilitate foaming at a commercially acceptable rate on mixing with isocyanate; whereas polyoxyethylene homopolymer chains exhibit sufficient reactivity but result in highly ordered or symmetric matrices (due to the absence of periodically extending and sterically hindering methyl groups which are characteristic of propylene oxide units) such that the resulting polyols generally are solids or waxes at ordinary reaction temperatures such as room temperature. However, it is contemplated that under certain conditions either of these types of filled polyols may be used satisfactorily in combination with the amine-based polyether polyols described above to produce a foam according to the invention.

Also less preferably, the filled polyether polyols can be of higher or lower functionality than reported in the preceding paragraph. The filled polyol functions as a cell-opener or cell-regulator during the foaming reaction. Secondarily, the filled polyol also provides some measure of stiffness to the foam as a result of the filler material. Preferably, the filler is styrene-acrylonitrile (SAN), and is present in the polyol in a concentration of 20-60, preferably 35-50 percent by weight. Alternatively, other suitable filled polyether polyols known or conventional in the art can be used. Selection of a polyol having comparable properties to an SAN filled polyether polyol is within the ability of a person of ordinary skill in the art. The filled polyether polyol component is not an amine-based polyol (i.e., it is a non-amine-based polyol).

The unfilled polyether polyol component also preferably is a polyoxypropylene-polyoxyethylene-extended polyol (preferably in the form of blocks having an ethylene oxide "tip" as explained above), but alternatively and less preferably also can be polyoxypropylene homopolymer extended or polyoxyethylene homopolymer extended as explained above.

Also it is preferred the unfilled polyether polyol is at least tri-functional and glycerin-based. Alternatively and less preferably, other unfilled polyether polyols could be used; e.g. 2 to 6 functional unfilled polyether polyols. The unfilled polyol component provides flexibility and recoverability to the foam, to complement the strength, endurance and rigidity imparted by the amine-based polyol component. Alternatively, other suitable unfilled polyether polyols known or conventional in the art can be used. Selection of an unfilled polyol having comparable properties to those discussed here is within the ability of a person of ordinary skill in the art. The unfilled polyether polyol component is not an amine-based polyol (i.e., it is a non-amine-based polyol).

From the preceding three paragraphs, one can see that both the filled and unfilled polyether polyol components are preferably tri-functional, and that each is non-amine-based. It is important to note that while Table 1 indicates in the rightmost column that the concentration of each of these components in the Part B composition can be zero, they cannot both be zero; there should be at least one non-amine-based polyol component in the Part B composition. In the event that a single non-amine-based polyol is used, it is preferably a filled polyol, and preferably has a high molecular weight, e.g. at least 3000-6000 for di-functional polyols, and at least 5000-10000 for tri-functional polyols, and is provided in the Part B composition in an amount of 10-75, preferably 15-70, preferably 20-65, preferably 30-60 parts by weight.

The combination of amine-based polyols and non-amine-based polyols described above, when combined with the other components listed in Table 1 and reacted as described below, has been found to produce excellent viscoelastic foams that mold well, have good mold release characteristics and are very strong (comparable to EPS for high energy impacts) foams that recover substantially 100% after impact. Formulations according to the invention (see Example 3 below) also have been prepared that produce very stable, non-shrinking free rise foams having the same or comparable strength and impact recovery characteristics as the moldable foams just mentioned.

The catalyst component listed in Table 1 is preferably a mixture of catalysts that have been found to promote a desirable sequence of foaming reactions and the successful production of the desired foam product from the components listed in Table 1. The catalyst component may include any of the following three types of catalysts where the sum of the weights of each catalyst corresponds to the parts by weight listed in Table 1 for the catalyst component. While an individual catalyst contribution can be zero, the combined contribution of all the catalysts should be greater than zero in the part B composition from Table 1.

1. Amine catalyst: Preferably one or more tertiary amine catalysts in an amount of 0-2.5 parts by weight.
2. Delayed action catalyst: 0-1 parts by weight, preferably combination delayed action tin/delayed action amine catalyst.
3. Trimerization catalyst: Preferably a quaternary ammonium salt trimer catalyst in an amount of 0-1 parts by weight.

Alternatively, the catalyst component can be any other suitable catalyst or catalysts selected by a person of ordinary skill in the art to provide suitable foaming to provide the invented viscoelastic foam having the physical properties and other characteristics herein described. The above stated catalysts have been found to provide a highly desirable foam according to the invention where it is believed the amine catalyst affords good foam processing including good foam moldability or stable, non-shrinking free rise foam. Where used, the delayed action catalyst simultaneously promotes good curing of the foam and good skin cure and, where used, the trimer catalyst acts as a blowing catalyst to expand the foam during the foaming reaction as well as functions as a high index gel catalyst. The preferred catalyst system results in very easily processable foams. The preferred catalyst systems are stable, in that each of the listed catalysts is stable with respect to one another.

The blowing agent component is preferably water, preferably distilled, deionized water to prevent unwanted impurities from entering the foaming composition and/or interfering with the foam reaction. Water can be used as the blowing agent advantageously in an amount of 1-3 parts by weight of the Part B composition of Table 1. The water reacts with the isocyanate component from the Part A composition to produce $CO_2$ (via a catalyzed mechanism using the catalysts described above). The production and expansion of $CO_2$ is responsible for foaming and expansion of the reacting mixture as is generally understood by persons of ordinary skill in the art. Less preferably, other suitable blowing agents could be used.

The black paste component is a conventional carbon-based pigment in a polyether or polyester carrier known in the art. Preferably the black paste has an OH number of about 20-150. The black paste provides pigmentation to the finished foam product.

By convention, the amounts of all the polyether polyol components from Table 1 sum to 100 parts by weight in the part B composition. In other words, the total parts by weight of the amine-based polyol component and the filled and unfilled polyol components equals 100 parts by weight in Part B, with the remaining components (catalyst, blowing agent, etc.) being present in the preferred parts by weight listed in Table 1.

In the Part A composition, the isocyanate is provided. The isocyanate can be provided in any suitable functional form, including aromatic or aliphatic, although advantageously it is provided in the form of pure or modified 4,4'-bisphenyl-methane diisocyanate or methylene bisphenyl diisocyanate (MDI). MDI is a commercially available source of isocyanate and is a solid crystalline substance provided as a white to yellowish powder or flakes. Pure MDI contains about 33.6% isocyanate (NCO) by weight. So if Part A is comprised exclusively of MDI powder or flakes, then the Part A composition has ~33.6% NCO. MDI is preferred because it is di-functional; i.e. each MDI molecule contains two reactive NCO sites. However, being a solid, MDI can result in some processing difficulties.

Modified MDI products that are liquids are preferred sources of isocyanate. Most preferably, the isocyanate is provided in the Part A composition as an allophanate-modified MDI prepolymer. MDI can be reacted with alcohols via a known reaction mechanism to provide the allophanate-modified MDI prepolymers. Like MDI the allophanate-modified MDI molecule is also di-functional, having two reactive NCO sites. However, unlike MDI, the allophanate-modified MDI prepolymer can be a liquid at standard temperature and pressure (298 K and 1 atm). This greatly simplifies foam processing. The allophanate-modified MDI molecule has a higher molecular weight than MDI. Hence it has a lower effectively concentration of NCO, typically about 20-30%. So, to achieve an equivalent amount of NCO, a larger mass of the allophanate-modified MDI must be provided compared to unmodified MDI. Less preferably, other NCO-containing prepolymers known in the art, e.g. other MDI prepolymers, TDI (toluene diisocyanate) prepolymers and the like can be used. Less preferably, mixtures of different types of prepolymers may also be used. Alternately, polymeric MDI, monomeric TDI or blends of polymeric MDI and monomeric TDI may also be used. Less preferably, mixtures of prepolymers with monomeric MDI, polymeric MDI or monomeric TDI may also be used.

It will be understood that in Table 1 the weight percent concentrations listed for isocyanate (% NCO) in the Part A composition are for the isocyanate (NCO) functional groups alone, excluding the weight of the molecule(s) to which the NCO groups are attached. So, for example, if the Part A composition consists of 100 weight percent allophanate-modified MDI prepolymer, (the most preferred embodiment), then NCO is present in the Part A composition in a concentration of typically 20-30% weight percent (see preceding paragraph).

To prepare a molded foam, the Part A and B compositions are prepared as described above and combined, mixed and poured or injected into a vented molding cavity. The vented molding cavity is covered with a lid and the mixed material is allowed to react and fill the mold. A typical reaction time is 3-15, preferably about 5-7 minutes, after which the finished foam part can be de-molded. The Part A and Part B compositions are combined in the mold in a particular ratio to achieve the desired index for the foaming reaction. Index is defined as the following stoichiometric ratio:

$$\text{Index} = 100 \times \frac{\text{Number of equivalents of isocyanate in Part } A}{\text{Number of equivalents of isocyanate reactive sites in Part } B}$$

Preferably, the Part A and Part B compositions are combined to provide an index of 60-130, preferably 65-115. The resulting viscoelastic foam can be very stiff, in part due to the structure of the isocyanate in the finished foam product, but is still a semi-rigid viscoelastic foam that recovers substantially 100% even after a high-energy impact; e.g. 4-7 m/s or greater. It has surprisingly been discovered that such a semi-rigid viscoelastic foam can be produced by the judicious selection of propylene oxide-extended amine or alkanolamine initiator molecules to produce amine-based polyether polyols that are substantially ethylene oxide-free, in combination with filled or unfilled non-amine-based or initiated polyoxypropylene-polyoxyethylene extended polyols as disclosed herein.

To prepare a free-rise foam, the Part A and The Part B compositions are prepared as described above and combined, mixed and poured into a suitable container that is open to atmospheric pressure. The free-rise foam is allowed to age for a period of time, e.g. about 24 hours, prior to sample preparation.

It is important for a viscoelastic foam according to the invention to have an amine-based polyol or polyol system to impart strength, recoverability, endurance and rigidity to the foam, and to have appropriately selected high molecular weight filled and/or unfilled non-amine-based polyol or polyols in combination with the amine-based polyol(s) to provide the desired flexibility to the foam. The combination of amine-based and filled and/or unfilled polyols described above has been found to provide semi-rigid viscoelastic foams with excellent impact and recovery properties. The invented foams recover to substantially 100% of their initial volume and shape following an impact, yet exhibit sufficient stiffness and flexibility so that they are effective at absorbing high as well as low-energy impacts. Foam compositions may include a suitable surfactant to function as a foam stabilizer or alternatively as a cell-opening agent during foaming. Silicones are typical surfactants used for this purpose. These types of surfactants may not be desirable in the present invention for molded foams as they can result in post-demold expansion of the finished foam product. This is highly undesirable. Where a free rise foam is contemplated, surfactants may be used advantageously.

It will be understood that additional components that are known or conventional in the art can be added in conventional amounts to either the Part A or Part B compositions described. Such additional components may be selected by a person having ordinary skill in the art to impart additional desired properties to the invented foam without substantially detracting from its improved and novel characteristics. Some such additional components may include (but are not limited to) reactive and non-reactive fillers, silicones, cross-linking agents, amine terminated polyethers, anti-microbial agents, fire retardants, plasticizers, colorants and pigments, chain extenders, etc.

EXAMPLES

Example 1

Eight foams were prepared from compositions according to the invention. Each of the eight foams was prepared by combining a Part A composition with a Part B composition having the components in the amounts listed in Table 2 below for the respective foam.

TABLE 2

Part A and B compositions for eight foams prepared according to the invention

| | Foam | | | | | | | |
|---|---|---|---|---|---|---|---|---|
| Element | 1 | 2 | 3 | 4 | 5 | 6 | 7 | 8 |
| Part B [components listed in part by weight (pbw)] | | | | | | | | |
| Monoethanolamine-based polyol | / | 4 | 9.5 | 9.5 | 11 | 15 | 14 | 9.5 |
| Triethanolamine-based polyol | 25 | 21 | 10.5 | 10.5 | / | / | 11 | 10.5 |
| Ethylenediamine-based polyol | 26 | 26 | 31 | 31 | 40 | 36 | 26 | / |
| Filled polyol | 24 | 24 | 24 | 49 | 24 | 24 | 24 | 16 |
| Unfilled polyol | 25 | 25 | 25 | / | 25 | 25 | 25 | 64 |
| Black Paste | 6 | 6 | 6 | 6 | 6 | 6 | 6 | 6 |
| Water | 3 | 3 | 3 | 3 | 3 | 3 | 2.5 | 4 |
| Catalyst 1 | 1 | 1.25 | 1.5 | 1.5 | 1.15 | 0.85 | 0.9 | 0.35 |
| Catalyst 2 | / | / | 0.05 | / | 0.1 | 0.175 | 0.15 | 0.25 |
| Catalyst 3 | 1 | 0.25 | / | / | / | / | / | / |
| Catalyst 4 | 0.5 | 0.5 | / | / | / | / | / | / |
| Part A | | | | | | | | |
| Isocyanate (wt. %) | 23 | 23 | 23 | 23 | 23 | 23 | 23 | 23 |
| Foam Index | 115 | 107 | 99 | 100 | 99 | 96 | 100 | 95 |

In Table 2, the following listed elements represent the following components:

The monoethanolamine-based polyol is a propylene oxide-extended polyether polyol having an OH No. of about 700, and does not have any ethylene oxide extension groups;

The triethanolamine-based polyol is a propylene oxide-extended polyether polyol having an OH No. of about 150, and does not have any ethylene oxide extension groups;

The ethylenediamine-based polyol is a propylene oxide-extended polyether polyol having an OH No. of about 60, and does not have any ethylene oxide extension groups;

The filled polyol is an SAN-filled polyoxypropylene-polyoxyethylene-extended polyether polyol having an OH No. of about 20, and is not amine-initiated or amine-based;

The unfilled polyol is also a polyoxypropylene-polyoxyethylene-extended polyether polyol having an OH No. of about 35, and is not amine-initiated or amine-based;

The Black Paste is a carbon black pigment dispersion, OH No. 105, available from Ferro Corporation as Blue Shade LV Super Black;

Catalyst 1 is an amine catalyst, OH No. 560, available from Air Products and Chemicals, Inc. as DABCO 33-LV;

Catalyst 2 is an amine catalyst, OH No. 251, available from Air Products and Chemicals, Inc. as DABCO BL-11;

Catalyst 3 is an delayed action catalyst, OH No. 689, available from Air Products and Chemicals, Inc. as DABCO DC-1;

Catalyst 4 is an trimerization catalyst, OH No. 687, available from Air Products and Chemicals, Inc. as DABCO TMR-4;

Isocyanate is an allophanate modified MDI, 23 wt. % NCO, available from Bayer Corporation as Mondur MA-2300.

As explained above, 23% NCO in the Part A composition of Table 2 means that Part A consists essentially of 100 wt. % of an allophanate modified MDI, about 23 wt. % of which consists in the NCO functional groups.

Each of the eight foams whose composition is listed in Table 2 was prepared according to the following method. The Part B components for each foam were pre-blended and then mixed for 10 seconds with the Part A component in a 1 pint cup to provide sufficient mixture to fill the mold at the desired density. The mixed material was then poured into a preheated (115-125° F.), vented aluminum tool defining a 5.5"×5.5"×1.0" cavity. The tool was covered with an aluminum lid using an air clamp at 80 psi and the foam allowed to expand in the cavity and cure for 5-7 minutes. The resulting foam plaque was then demolded and allowed to age a minimum of 24 hours prior to dynamic testing. Each of these eight foams was then subjected to dynamic impact testing in comparison to conventional expanded polystyrene (EPS) foam. The results of the dynamic testing of each of the eight foams according to the invention and of the EPS comparator are shown in Table 3.

TABLE 3

Physical property data for dynamic impact/spherical impactor
Foam Plaques with a .097" (high density polyethylene) HDPE Cover

| | Foam | | | | | | | | |
|---|---|---|---|---|---|---|---|---|---|
| | 1 | 2 | 3 | 4 | 5 | 6 | 7 | 8 | EPS |
| Temperature(° F.) | 78 | 78 | 78 | 78 | 78 | 78 | 78 | 78 | 78 |
| Density (pcf) | 6.51 | 6.55 | 6.94 | 6.65 | 6.71 | 6.61 | 6.62 | 6.69 | 5.0 |
| Impaact Velocity (m/s) | 6.23 | 6.23 | 6.24 | 6.23 | 6.23 | 6.25 | 6.24 | 6.23 | 6.23 |
| Peak g-value | 215 | 205 | 190 | 187 | 199 | 184 | 180 | 188 | 200 |

As can be seen, the foams according to the invention performed comparably well, and in most cases better than EPS foam for about a 6.23 m/s, relatively high-speed impact. Yet, the invented foams all recovered substantially 100% after impact, whereas the EPS was permanently deformed following a single impact.

Example 2

Figure 2:
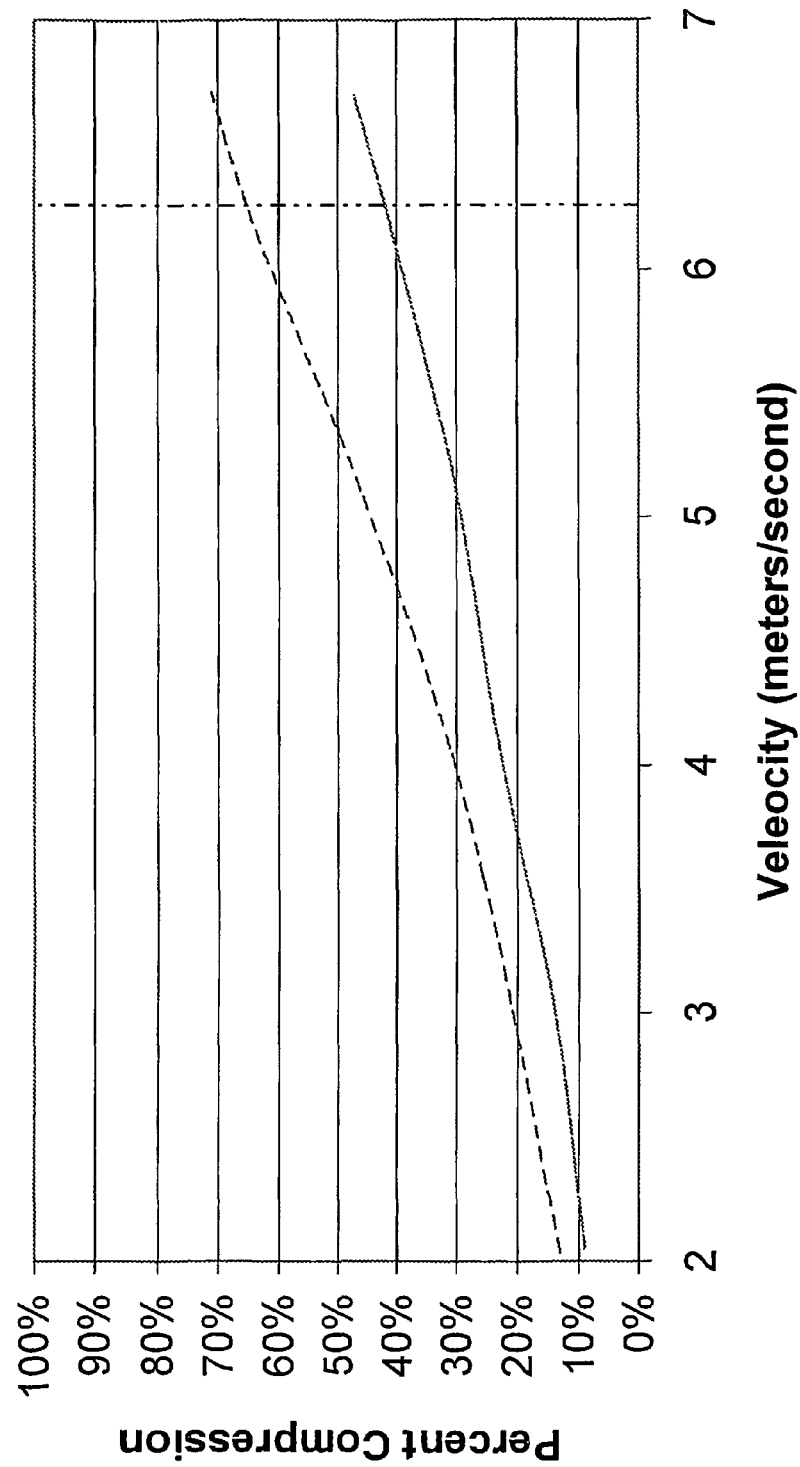
FIG. 2 is a graph of percent compression versus velocity comparing the performance of the invented viscoelastic foam of Example 1 with expanded polystyrene using a flat impactor.

In another experiment, foam according to the invention was compared to EPS to test break-through acceleration and percent compression versus impact velocity according to ASTM F2040. In this experiment, the Foam No. 2 from Table 2 in Example 1 was used and compared to EPS. The test samples for each of the invented and EPS foams were square samples measuring 5.5"×5.5"×1" thick. The tests were conducted first using a flat circular impactor having a 4-inch diameter, and then using a spherical impactor that also had a 4-inch diameter. The results are provided in FIGS. 1-2 and 3-4 for the flat and spherical impactors respectively. As can be seen from FIG. 1, using the flat impactor the invented foam exhibited significantly less breakthrough acceleration than EPS for impact velocities from 2 to about 6.5 m/s (i.e. resulting from unabsorbed energy which was transmitted through the foam); the invented foam exhibited about 50% less breakthrough acceleration measured in g's from 2 to about 6 m/s. Also, from FIG. 2, using the flat impactor the invented foam exhibited a greater degree of compression compared to EPS across the entire tested range of impact velocities, from 2 to about 6.5 m/s. This may help explain why the resulting breakthrough acceleration was lower for the invented foam than for the EPS as described above. It is also noteworthy that following the impact tests, the invented foam recovered to substantially 100% of its initial volume and shape with no or negligible noticeable loss of rigidity or strength. Whereas, after each impact, the EPS was irreversibly crushed and was replaced with a fresh EPS test foam in order to conduct an additional impact test at a different impact velocity.

Figure 3:
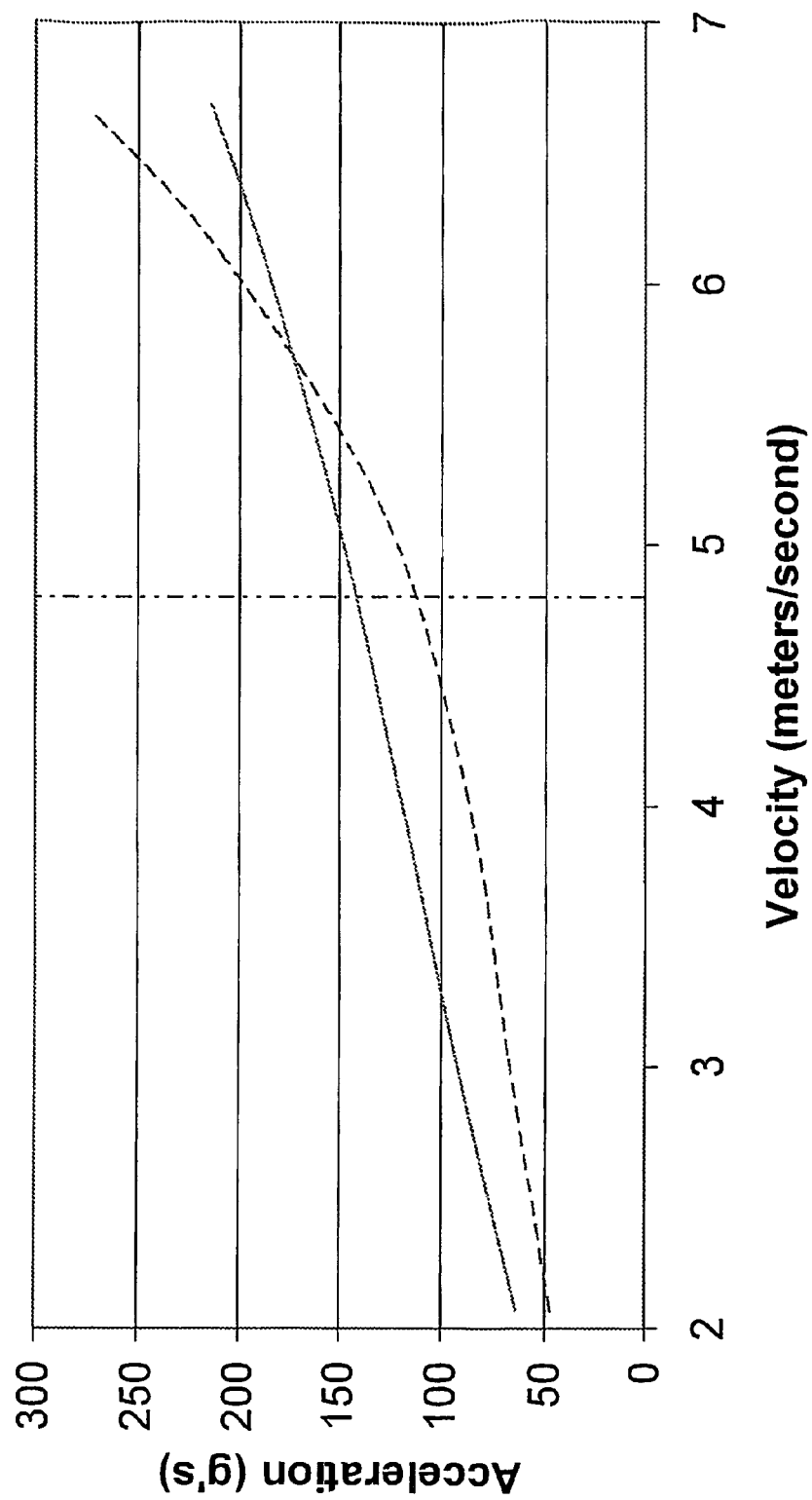
FIG. 3 is a graph similar to that of FIG. 1, except that a spherical impactor was used.
Figure 4:
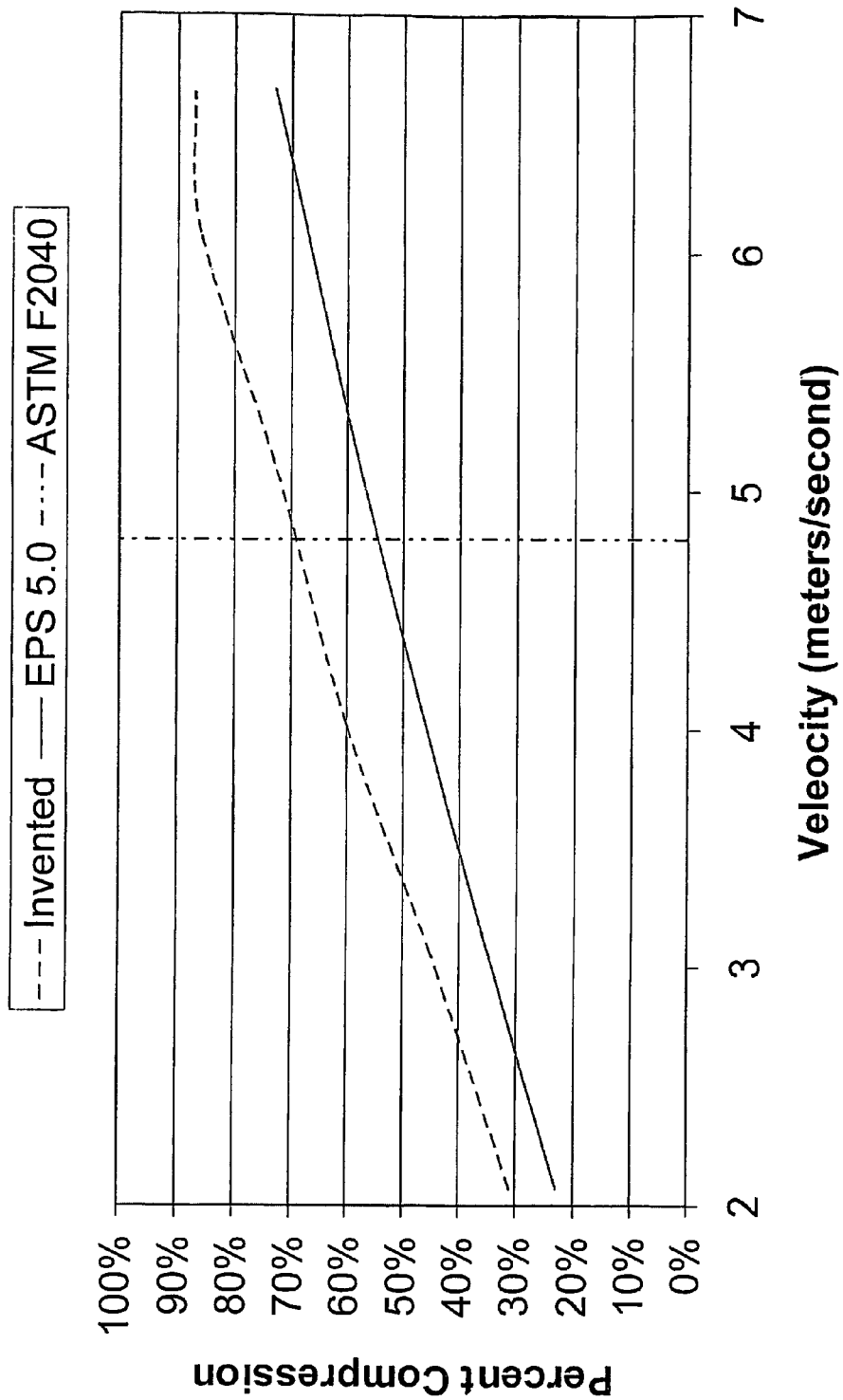
FIG. 4 is a graph similar to that of FIG. 2, except that a spherical impactor was used.
Figure 5:
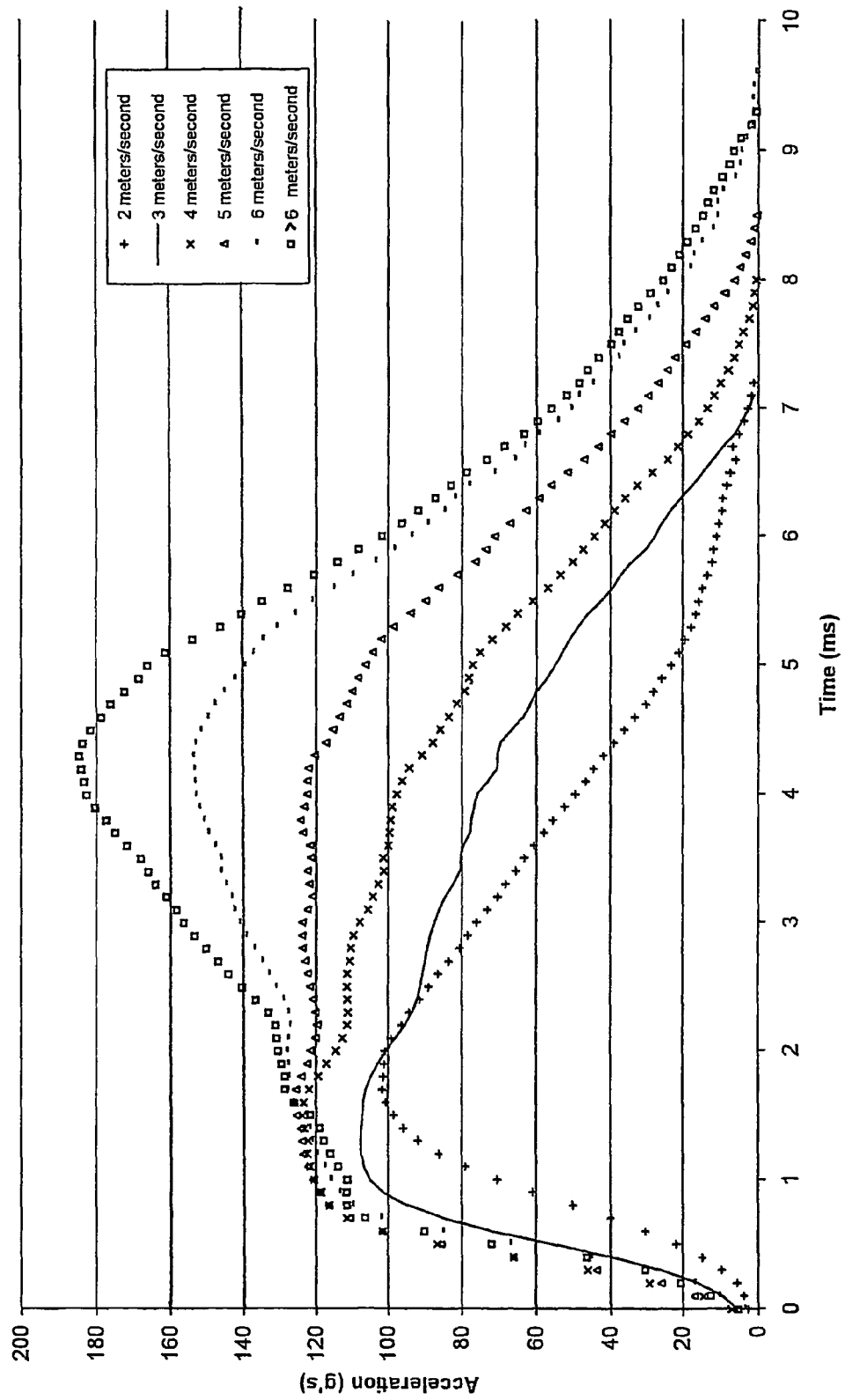
FIG. 5-8 are graphs of additional physical property data measured for the invented viscoelastic foam of Example 1 using a flat impactor for impact velocities ranging from 2 m/s to 7 m/s.
Figure 6:
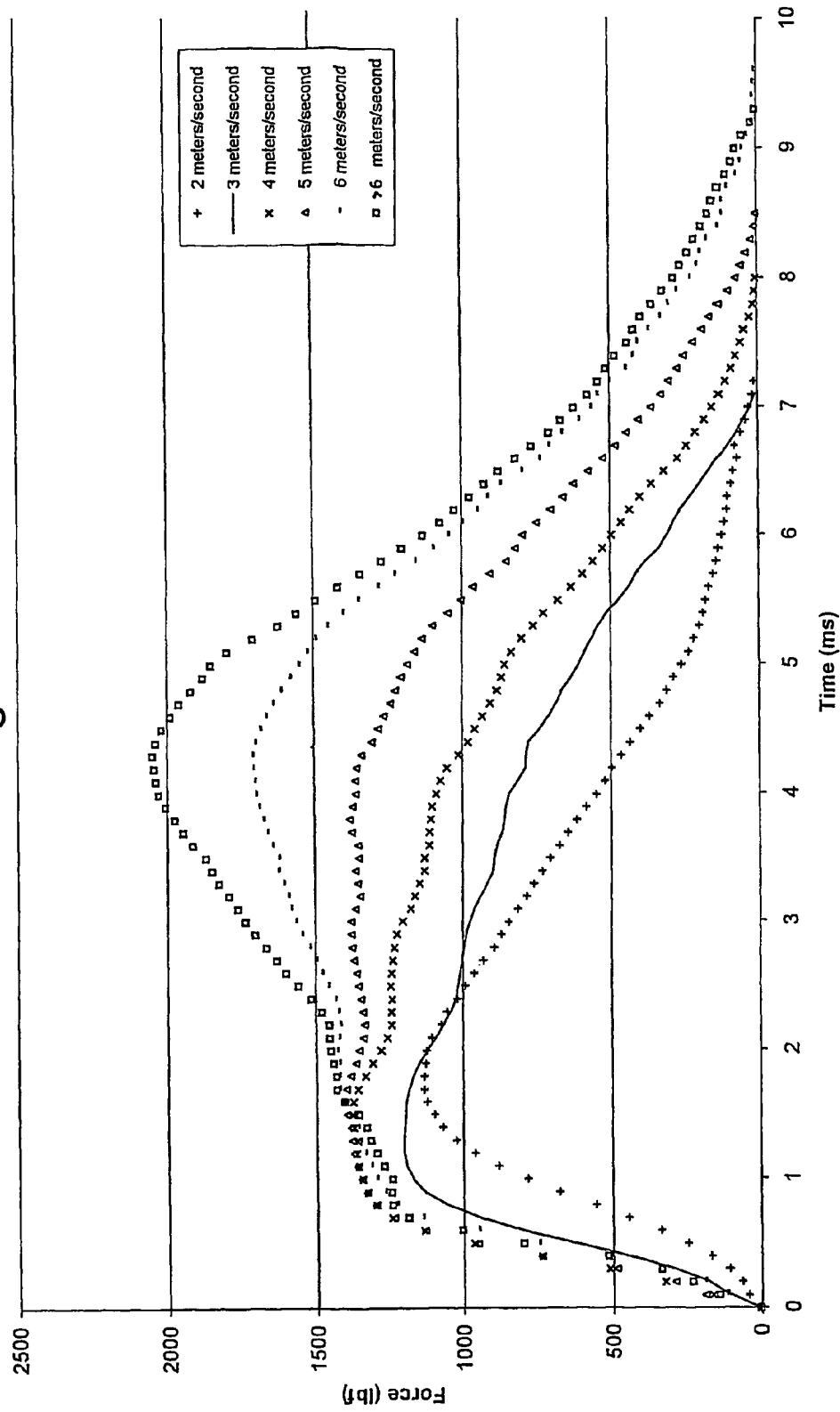
Figure 7:
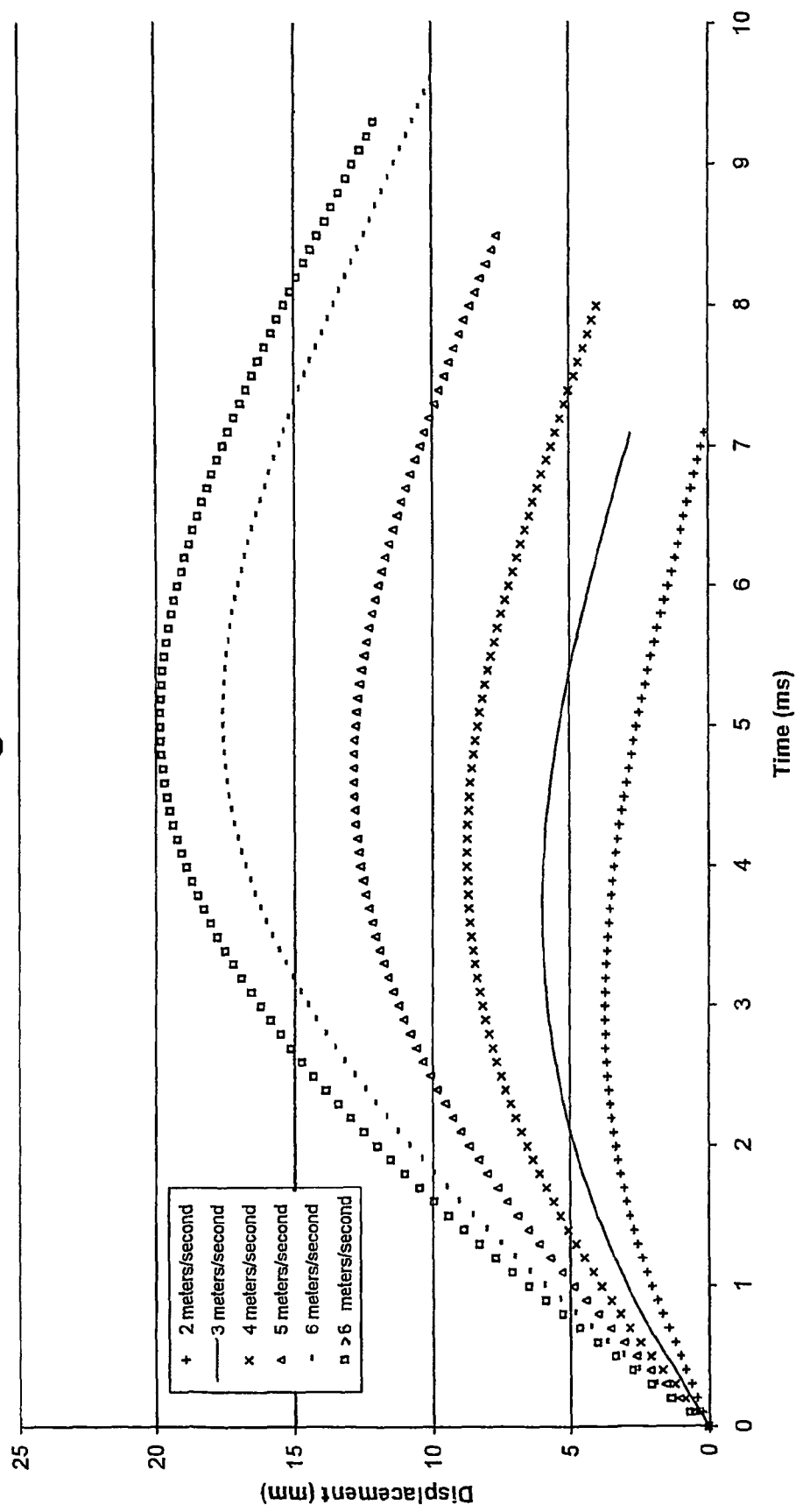
Figure 8:
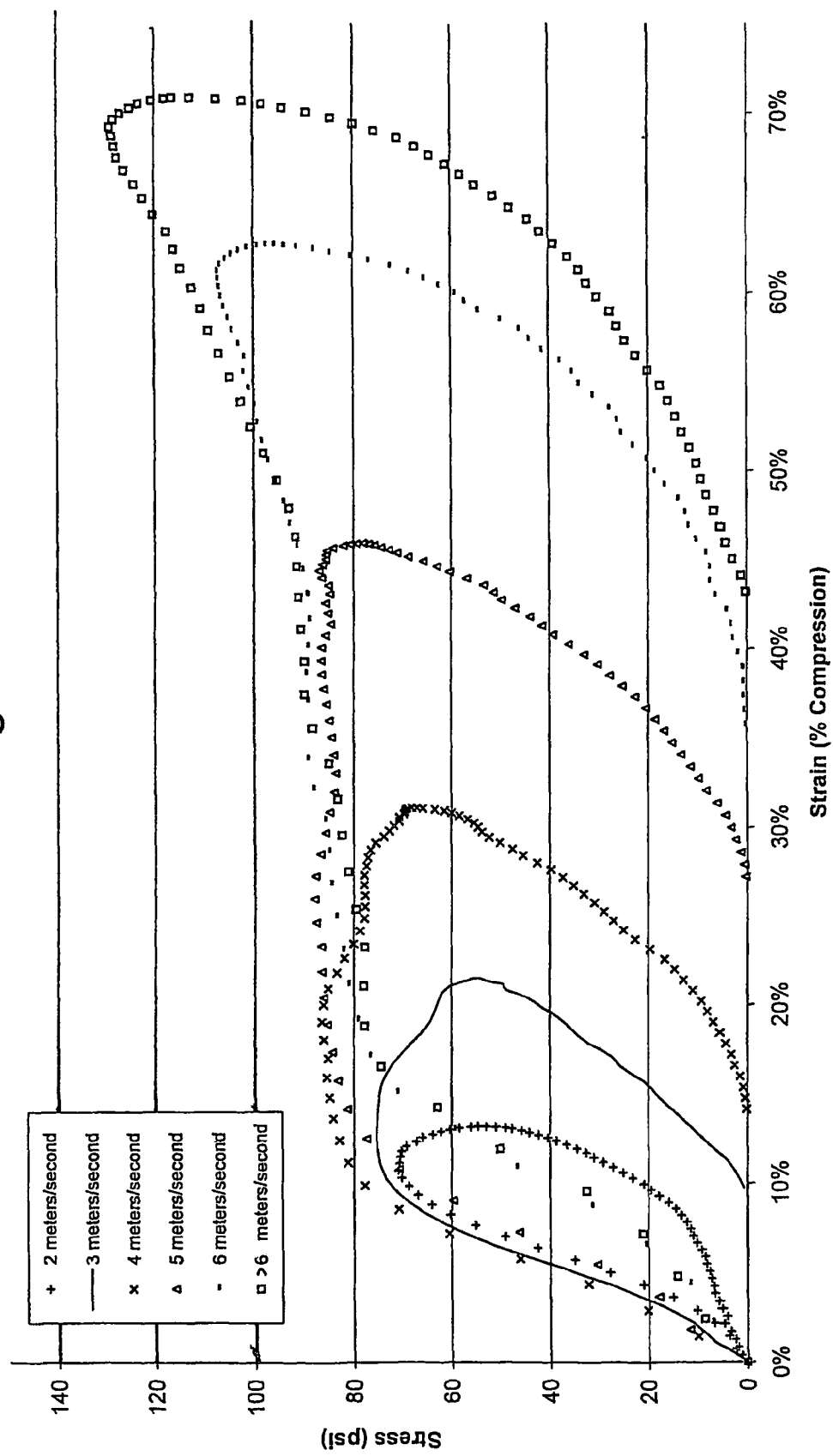
Figure 9:
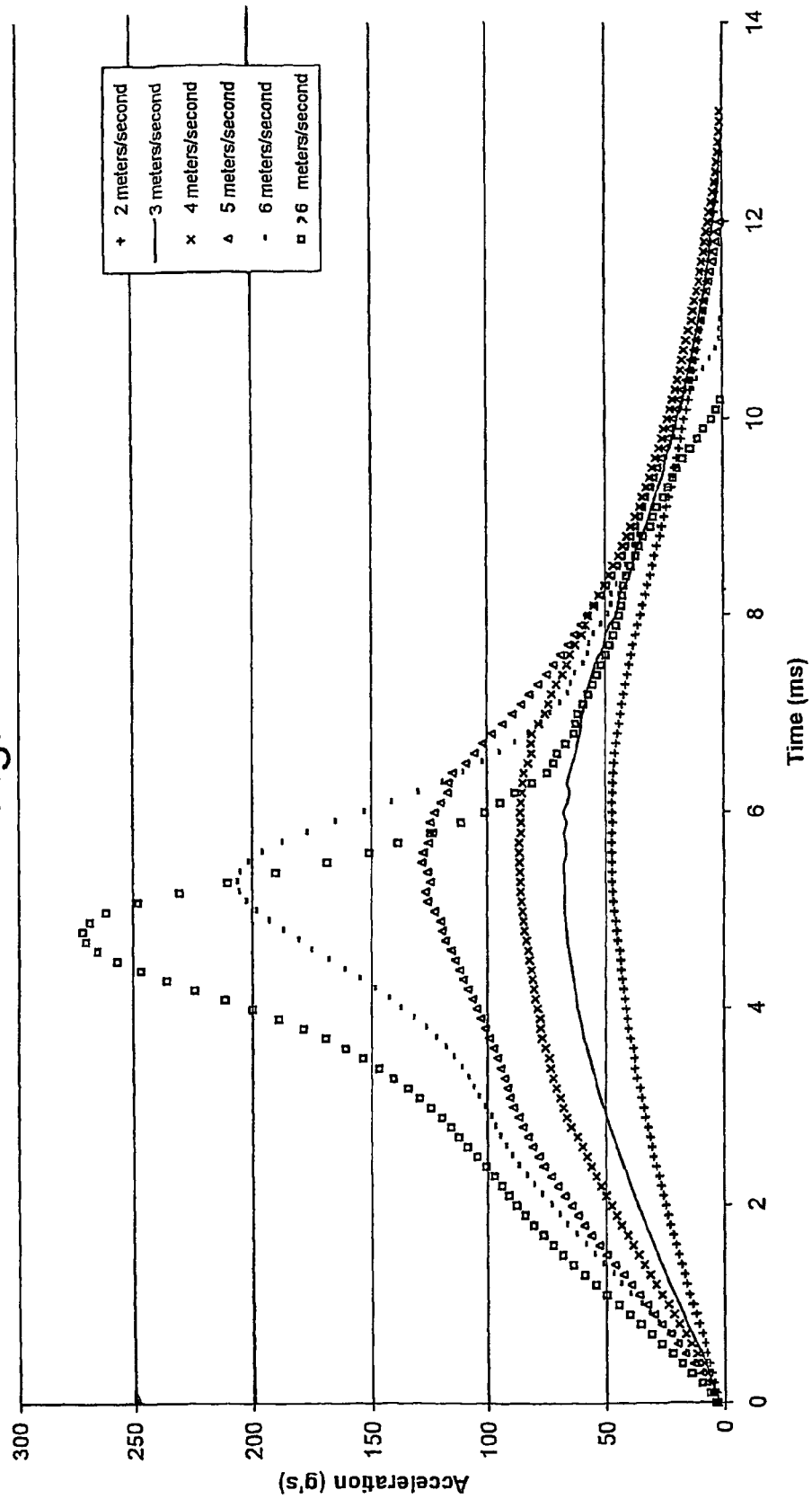
FIGS. 9-12 are graphs of additional physical property data measured for the invented viscoelastic foam of Example 1 using a spherical impactor for impact velocities ranging from 2 m/s to 7 m/s.
Figure 10:
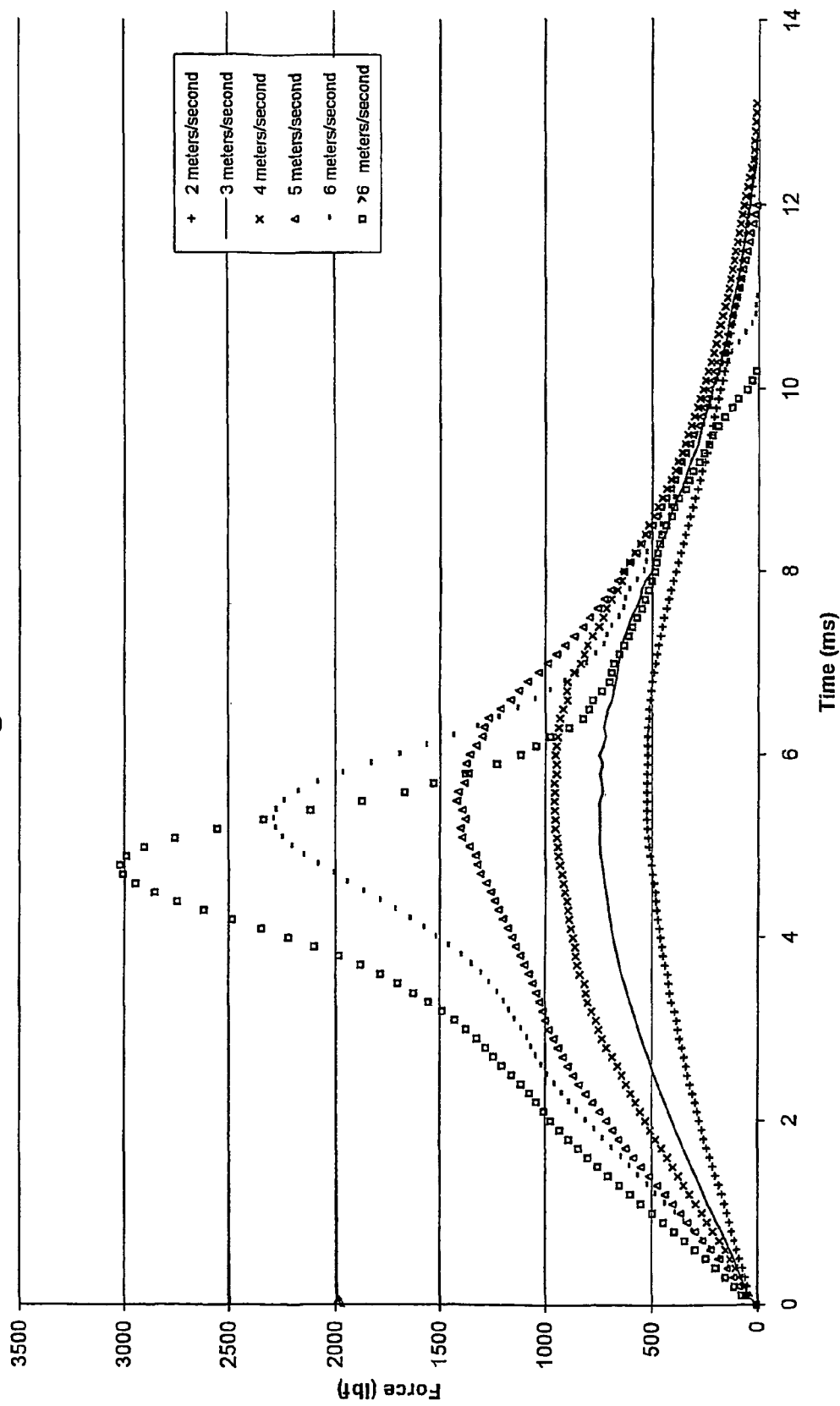
Figure 11:
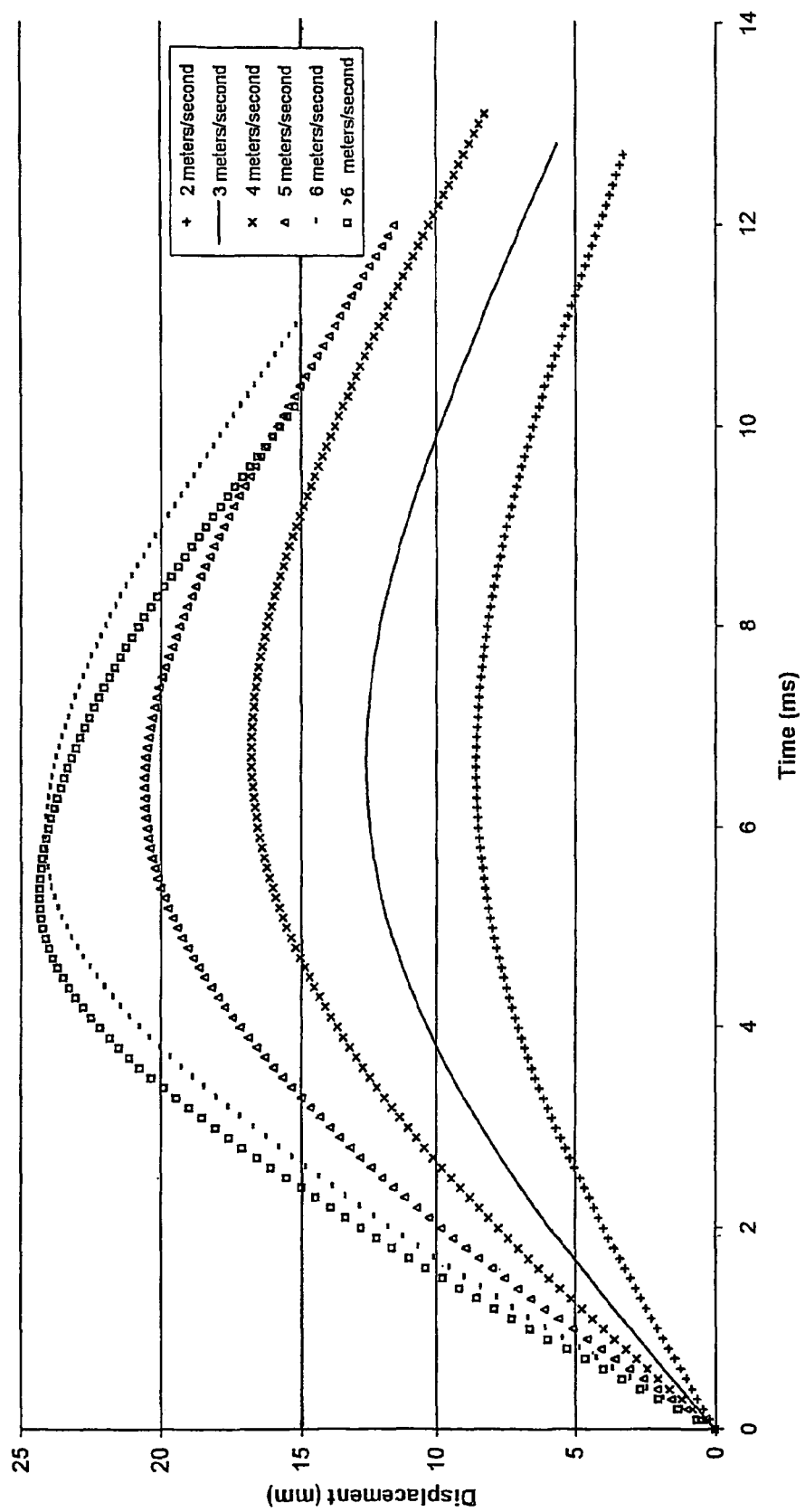
Figure 12:
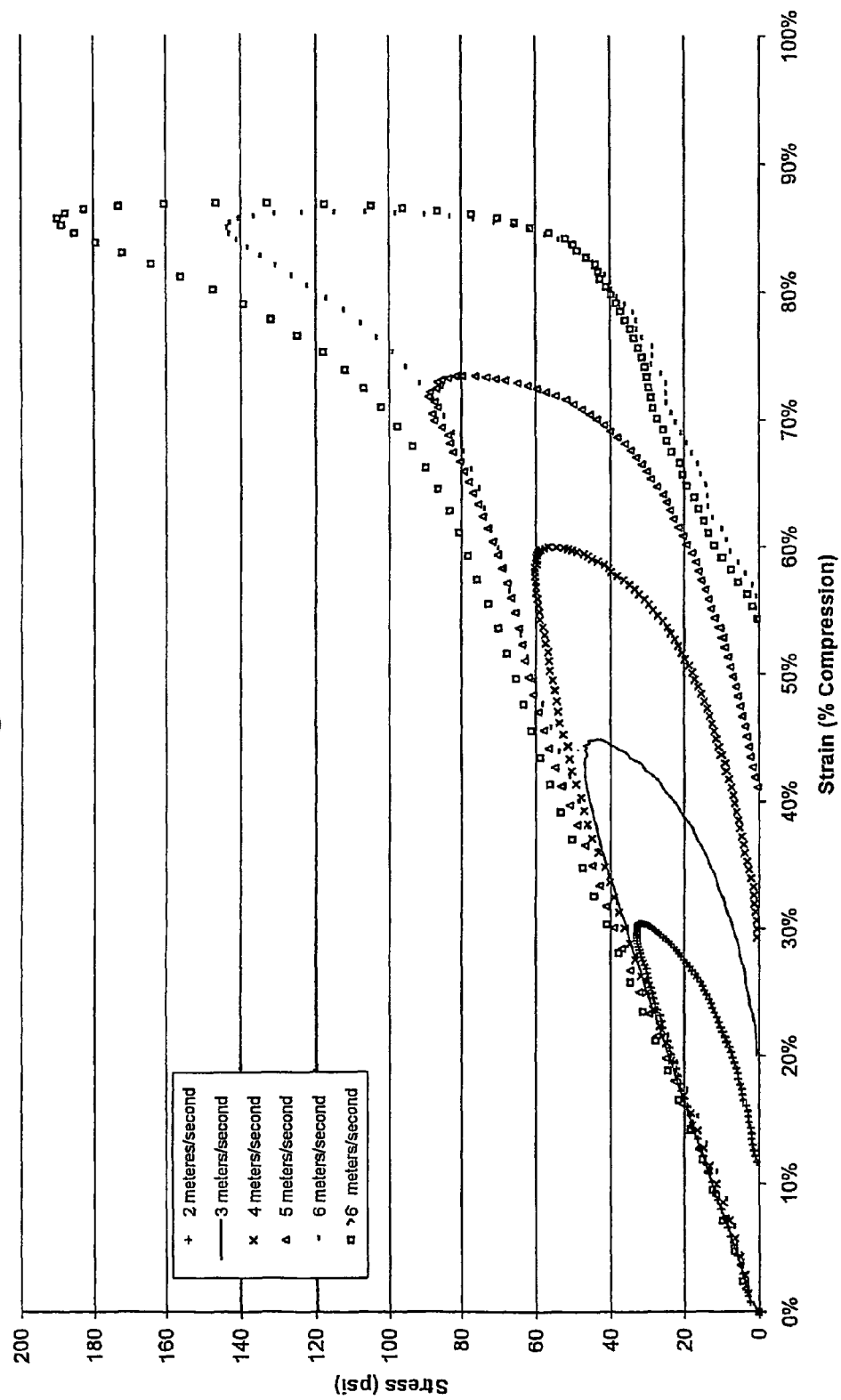
Figure 13:
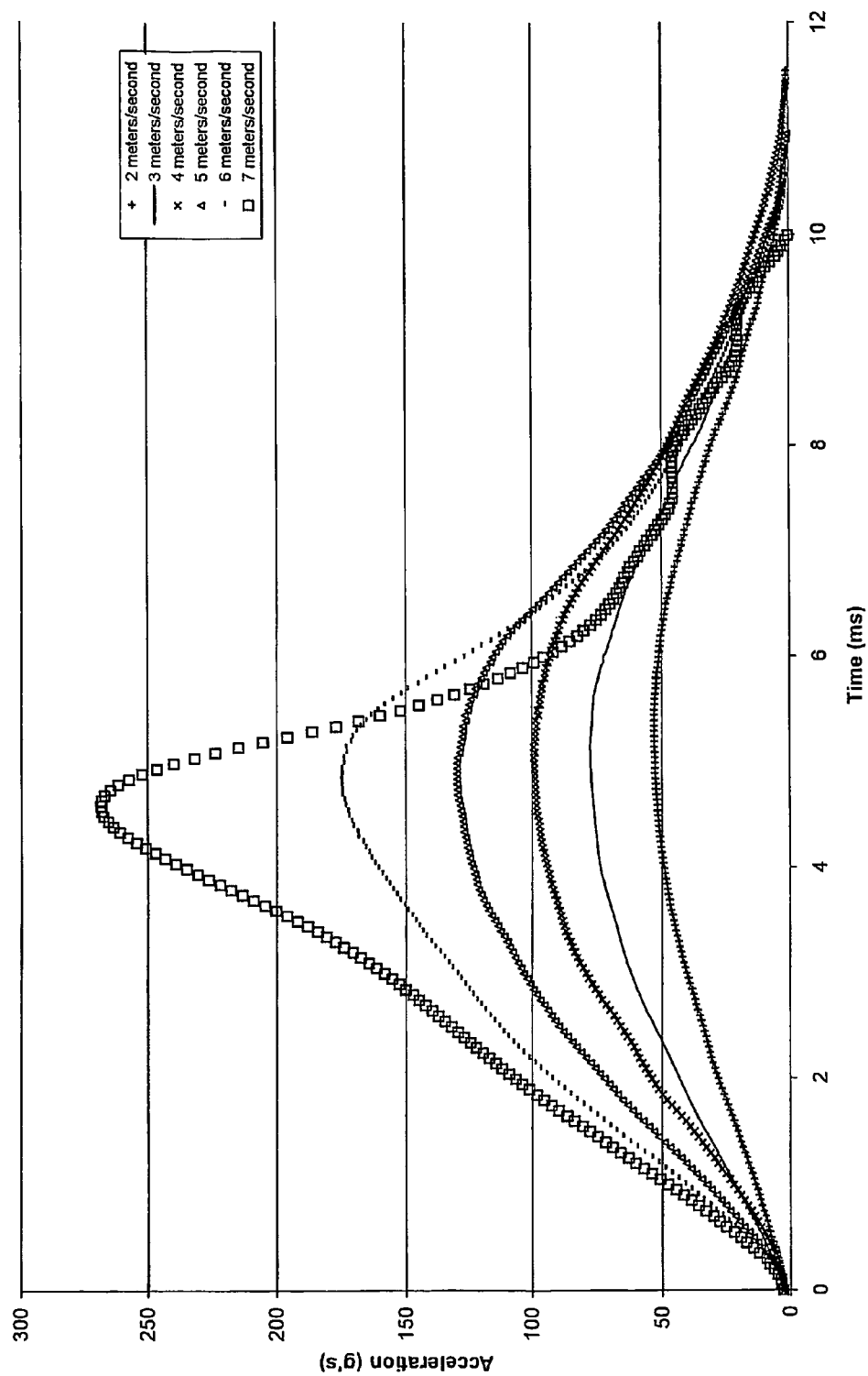
FIGS. 13-16 are graphs of physical property data measured for the invented viscoelastic foam of Example 2 using a spherical impactor for impact velocities ranging from 2 m/s to 7 m/s.
Figure 14:
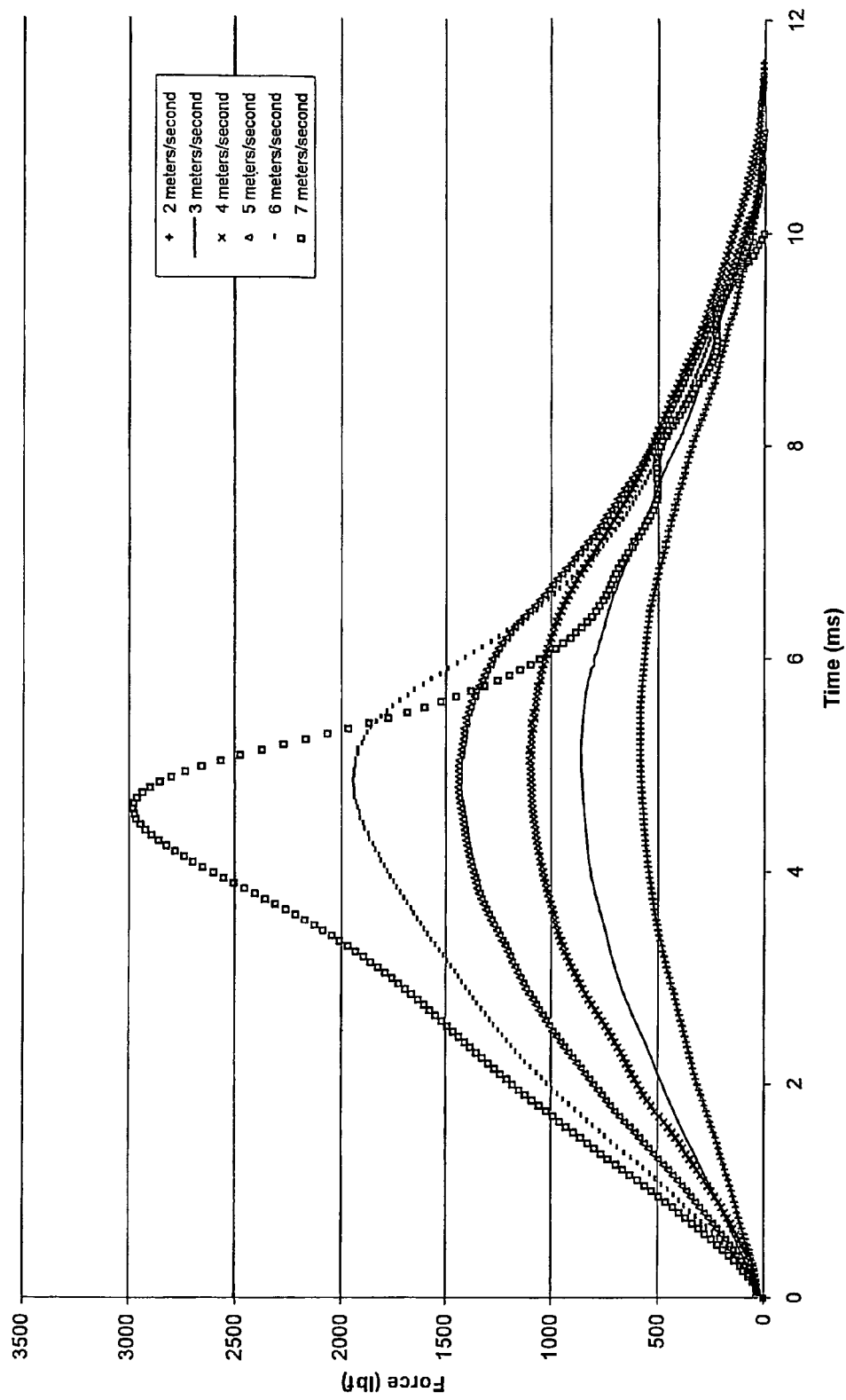
Figure 15:
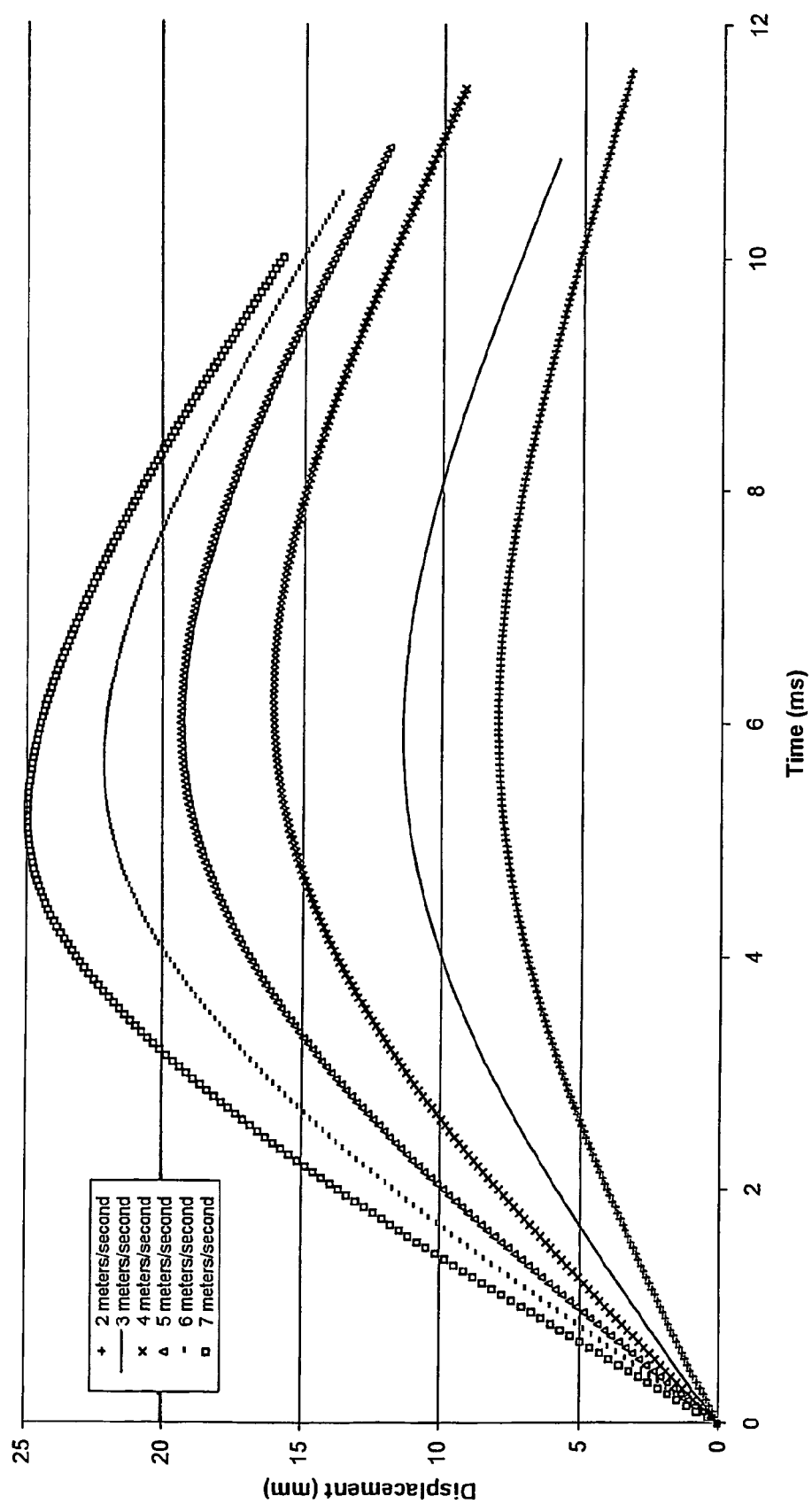
Figure 16:
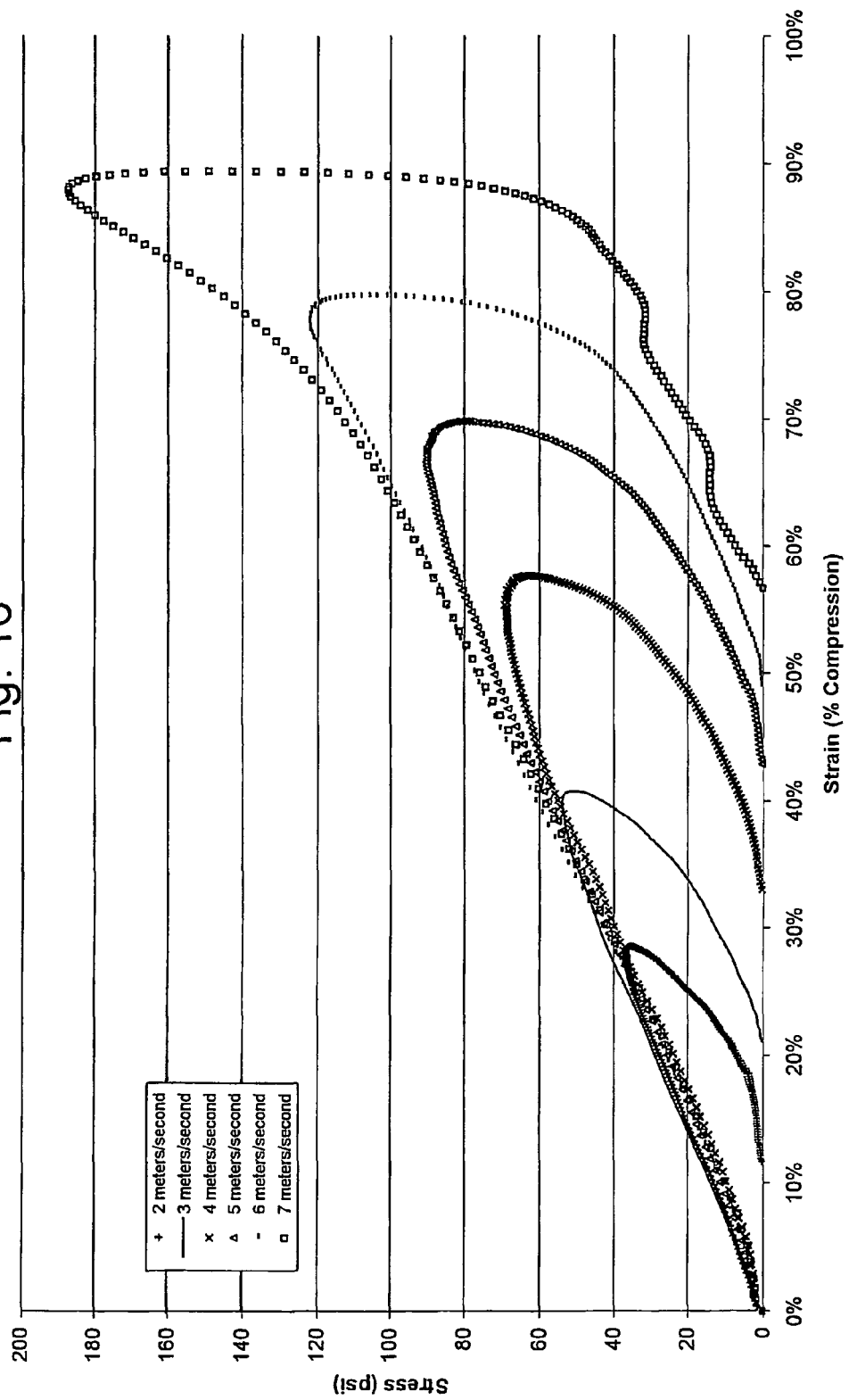

FIG. 3 shows the acceleration versus velocity data for the spherical impactor experiment. From the figure, it can be seen that the invented foam exhibited superior breakthrough acceleration abatement compared to the EPS for low to moderate impact speeds, e.g. from 2 to about 5.8 m/s. Also, FIG. 4 shows the invented foam exhibited superior percent compression across the entire range of tested impact speeds, from 2 to about 6.5 m/s.

FIGS. 5-12 provide additional physical property data for the viscoelastic foam according to the invention. The data in FIGS. 5-8 were measured using a flat impactor as described above, and the data in FIGS. 9-12 were measured using a spherical impactor as described above. As can be seen from the data, the invented foam provides excellent strength and impact absorption characteristics, while retaining its viscoelasticity and substantially recovering 100% following an impact.

Example 3

Ten additional foams were prepared from compositions according to the invention. These foams were produced using free rise foam techniques rather then being molded foams as in Examples 1 and 2. Each of these ten additional foams (numbered 9-18 in Table 4 for continuity with Table 2 above) was prepared by combining a Part A composition with a Part B composition having the components in the amounts listed in Table 4 below for the respective foam.

TABLE 4

Part A and B compositions for ten additional foams according to the invention

| | Foam | | | | | | | | | |
|---|---|---|---|---|---|---|---|---|---|---|
| | 9 | 10 | 11 | 12 | 13 | 14 | 15 | 16 | 17 | 18 |
| | Part B [components listed in part by weight (pbw)] | | | | | | | | | |
| Element | | | | | | | | | | |
| Monoethanolamine-based polyol | / | / | / | / | / | / | / | 8.5 | 8.5 | 8.5 |
| Triethanolamine-based polyol | 70 | 70 | 20 | 60 | 60 | 60 | 60 | 61.5 | 61.5 | 61.5 |
| Unfilled Polyol | / | / | 40 | / | / | / | / | / | / | 30 |
| Filled Polyol | 30 | 30 | 40 | 40 | 40 | 40 | 40 | 30 | 30 | / |

TABLE 4-continued

Part A and B compositions for ten additional foams according to the invention

| | Foam | | | | | | | | | |
|---|---|---|---|---|---|---|---|---|---|---|
| | 9 | 10 | 11 | 12 | 13 | 14 | 15 | 16 | 17 | 18 |
| DEOA | / | / | / | / | / | 1 | 1 | / | / | / |
| Butane diol | 1.5 | 1.5 | / | / | / | / | / | / | / | / |
| Black paste | 1 | 1 | 1 | 1 | 1 | 1 | 1 | 1 | 1 | / |
| Stabilizing silicone | / | / | 0.35 | 0.5 | 0.5 | 0.5 | 0.5 | / | / | / |
| Cell-regulating silicone | .65 | .65 | / | 0.5 | 0.5 | 0.5 | 0.5 | 0.6 | 0.6 | 0.6 |
| Water | 1.5 | 1.5 | 1.5 | 2 | 2 | 2 | 2 | 1 | 1 | 1 |
| Catalyst 1 | 1.05 | / | 0.9 | 1 | 1 | / | / | 0.45 | 0.30 | 0.22 |
| Catalyst 2 | / | / | / | / | / | / | / | 0.45 | 0.15 | 0.18 |
| Catalyst 3 | / | 0.4 | / | / | 0.15 | 0.1 | 0.175 | / | / | / |
| | Part A | | | | | | | | | |
| Isocyanate (wt. %) | 23 | 23 | 23 | 23 | 23 | 23 | 23 | 23 | 23 | 23 |

COMBINED PARTS A AND B ABOVE TO PRODUCE THE FOLLOWING FOAMS

Parts by weight Part A per 100 parts by weight Part B

| Foam Index | | | | | | | | | | |
|---|---|---|---|---|---|---|---|---|---|---|
| 110 | / | / | / | / | 79.5 | / | / | / | / | / |
| 105 | / | / | / | / | / | / | 79.5 | / | / | / |
| 100 | 71.2 | 71.3 | 48.6 | 72 | 72.3 | 75.4 | 75.6 | 71.8 | 71.5 | 72.8 |
| 95 | / | / | 46.1 | / | / | / | / | / | / | / |
| 80 | 56.9 | 57.1 | / | 57.7 | / | 60.3 | / | 57.4 | 57.2 | 58.3 |
| 70 | / | / | / | 50.4 | / | 52.8 | / | / | / | / |

In Table 4, the following listed elements represent the following components:

The monoethanolamine- and triethanolamine-based polyols are the same as described above in Example 1;

The unfilled polyol is the same as described above in Example 1;

The filled polyol is an SAN-filled polyether polyol and is the same as described in Example 1;

DEOA is diethanolamine;

Butane diol requires no additional explanation;

The black paste is the same as described above in Example 1;

The stabilizing silicone is a silicone product available under product number B8418 from Degussa-Goldschmidt, and is provided to produce a fine cell structure and foam stability;

The cell regulating silicone is a silicone product available from GE Silicones under product number SF96-350, and is provided to regulate the cell structure of the foam;

Catalyst 1 is amine catalyst DABCO 33LV as described in Example 1;

Catalyst 2 is DABCO BL-11 as described in Example 1;

Catalyst 3 is combination delayed action tin/delayed action amine catalyst, DABCO DC1 from Air Products as described in Example 1; and Isocyanate is an allophanate modified MDI, 23 wt. % NCO, as described in Example 1.

In Table 4, a reported Part A/Part B ratio (parts A per 100 parts B) indicates that a foam was prepared according to the invention based on the indicated foam composition at the listed index. Thus, for example, for foam composition 9 in Table 4, foams were prepared at both 100 and 80 index using the reported Part A/Part B ratios; similarly, 100 and 95 index foams were made from foam composition 11 in Table 4, etc. It has been found that foams made from each of the compositions listed in Table 4 exhibit excellent viscoelastic characteristics, including a high degree of impact acceleration-rate sensitivity (foam is more easily deflectable on low speed impact compared to high speed impact) and slow recovery following deflection, making them well suited for impact damping applications across a very wide range of impact speeds.

As is evident from the examples, foams can be prepared according to the invention (e.g., as in Example 1) that are highly recoverable semi-rigid viscoelastic foams capable of absorbing impact energy from high-energy impacts (4-7 m/s or greater) to a comparable degree relative to conventional EPS foams. Unlike EPS, however, the invented foams are viscoelastic and recover well following an impact meaning that the foams can be reused and need not be discarded after each impact. In addition, because the invented foams are viscoelastic foams and not non-recoverable rigid foam like EPS, the invented foams can effectively absorb and deflect the impact energy from low to moderate impact speeds. EPS is useless for this purpose because it has virtually no energy absorbing capacity at or below its threshold crush velocity. Below this velocity, EPS acts as a rigid solid and transmits virtually all impact energy to the underlying body part of the user.

Alternatively, foams can be prepared according to the invention, such as the compositions shown in Example 3, that are also highly recoverable semi-rigid viscoelastic foams but which exhibit a lesser degree of rigidity as compared to those of Example 1. These foams are particularly useful, for example, as viscoelastic and energy-absorbing comfort foams for use in a variety of sports or combat gear applications.

It will be understood from the above that the formulation of the invented foam can be tuned to provide a relatively stiffer or more flexible foam depending on the particular application, but generally, the invented foam is a semi-rigid viscoelastic foam.

In an alternative embodiment, surprisingly it has been found that the polyol composition of the present invention may be reacted with the isocyanate of the present invention without the use of added water (or other blowing agent) to produce a higher density foamed (45-60 pcf) elastomer with excellent energy (vibrational) absorption characteristics. This type of material could function as a vibration isolator or dampener for delicate equipment during transportation or while in use.

Although the above-described embodiments constitute the preferred embodiments, it will be understood that various changes or modifications can be made thereto without departing from the spirit and the scope of the present invention as set forth in the appended claims.

What is claimed is:

1. A viscoelastic foam made from a Part A composition and a Part B composition, the Part A composition comprising 20-30 weight percent isocyanate (NCO) and the Part B composition consisting of:

(i) 50-80 parts by weight of propylene oxide-extended amine-based polyether polyol having substantially no ethylene oxide (EO) extension units;
(ii) 20-50 parts by weight of a non-amine filled polyether polyol;
(iii) 0.01-4 parts by weight of catalyst;
(iv) 0-1 parts by weight of a cross-linking agent;
(v) 1-6 parts by weight black paste;
(vi) 0.35-0.6 parts by weight surfactant;
(vii) 1-3 parts by weight water;

wherein all values expressed as weight percents are based on the total weight of the Part A composition, and all parts by weight are parts by weight of the Part B composition, said Part B composition having 100 parts by weight total polyols.

2. A viscoelastic foam according to claim 1, said propylene oxide-extended amine-based polyether polyol being triethanolamine-based, said cross-linking agent being diethanolamine and said surfactant being silicone.

* * * * *

UNITED STATES PATENT AND TRADEMARK OFFICE
CERTIFICATE OF CORRECTION

PATENT NO. : 8,975,306 B2  
APPLICATION NO. : 10/576033  
DATED : March 10, 2015  
INVENTOR(S) : Charles M. Milliren Page 1 of 1

It is certified that error appears in the above-identified patent and that said Letters Patent is hereby corrected as shown below:

In the Specification,

At line 49 of Column 1 of the patent, please correct "(UPS)" to read "(EPS)"

At line 17 of Column 4 in Table 1-continued of the patent, please correct "1.6-22" to read "1.6-2.2"

In the Claims,

At line 9 of Column 16 of the patent, in claim 1, please correct "0.35-0.6" to read "0.35-0.65"

Signed and Sealed this
Twenty-eighth Day of July, 2015

Michelle K. Lee
*Director of the United States Patent and Trademark Office*